United States Patent [19]
Ooka et al.

[11] Patent Number: 5,386,484
[45] Date of Patent: Jan. 31, 1995

[54] OPTICAL FIBER TYPE POLARIZER

[75] Inventors: Akihiro Ooka; Kenji Kawamura; Yozo Nishiura; Katsuaki Itoh; Takaki Iwashita; Yasuhiko Nishi, all of Osaka; Noritaka Kuroda; Hayato Hasegawa, both of Hisai, all of Japan

[73] Assignee: Sumitomo Electric Industries, Ltd., Osaka, Japan

[21] Appl. No.: 118,809

[22] Filed: Sep. 9, 1993

[30] Foreign Application Priority Data

| Feb. 10, 1992 | [JP] | Japan | 5-003890[U] |
| Sep. 10, 1992 | [JP] | Japan | 4-242157 |
| Nov. 30, 1992 | [JP] | Japan | 4-320951 |
| Jan. 27, 1993 | [JP] | Japan | 5-011896 |

[51] Int. Cl.⁶ .................................. G02B 6/17
[52] U.S. Cl. .................... 385/11; 385/24; 385/13
[58] Field of Search ............ 385/1, 11, 13, 14, 12, 385/24, 31; 365/350

[56] References Cited

U.S. PATENT DOCUMENTS

| 4,255,018 | 3/1981 | Ulrich et al. | 385/11 X |
| 4,450,406 | 5/1984 | Bobb | 385/11 X |
| 4,468,090 | 8/1984 | Ulrich et al. | 385/11 |
| 4,573,795 | 3/1986 | Auch et al. | |
| 5,127,066 | 6/1992 | Poggiolini | 385/11 X |
| 5,136,667 | 8/1992 | Ohno et al. | 385/11 |
| 5,187,757 | 2/1993 | Ohno et al. | 385/11 |

FOREIGN PATENT DOCUMENTS

| 0174668 | 3/1982 | European Pat. Off. | G01P 3/36 |
| 0264941 | 4/1988 | European Pat. Off. | B65H 74/14 |
| 0312444 | 4/1989 | European Pat. Off. | B65H 75/18 |
| 0459261 | 4/1991 | European Pat. Off. | G02B 6/44 |
| 0474389 | 3/1992 | European Pat. Off. | G01C 19/72 |

OTHER PUBLICATIONS

Patent Abstracts of Japan, vol. 12, No. 350 (P-760) (3197) Sep. 20, 1988.
Patent Abstracts of Japan, vol. 12, No. 25 (P-659), Jan. 26, 1988.
Optical Fiber Communication Conference 91, 8, 9, San Diego, Calif., 18–22 Feb. 1991, Proceedings, IEEE, New York, A Goltaross et al.; "Concatenation of Polarization Dispersion: Relationship Between Measurement Before and After the Installation of a Long Terrestrial Cable", p. 87.

*Primary Examiner*—Akm E. Ullah
*Attorney, Agent, or Firm*—Lane, Aitken & McCann

[57] ABSTRACT

An optical fiber type polarizer comprises a first optical fiber constituted by a birefringent optical fiber wound at a predetermined winding radius and having winding start and end fixed to each other by an adhesive, the first optical fiber having short extra portions respectively extending from the winding start and end, and the length of each of the short extra porions being at least as small as the predetermined winding radius. The optical fiber type polarizer further comprises a second optical fiber spliced to one of the short extra portions of the first optical fiber, and a third optical fiber spliced to the other of the short extra portions of the first optical fiber.

13 Claims, 43 Drawing Sheets

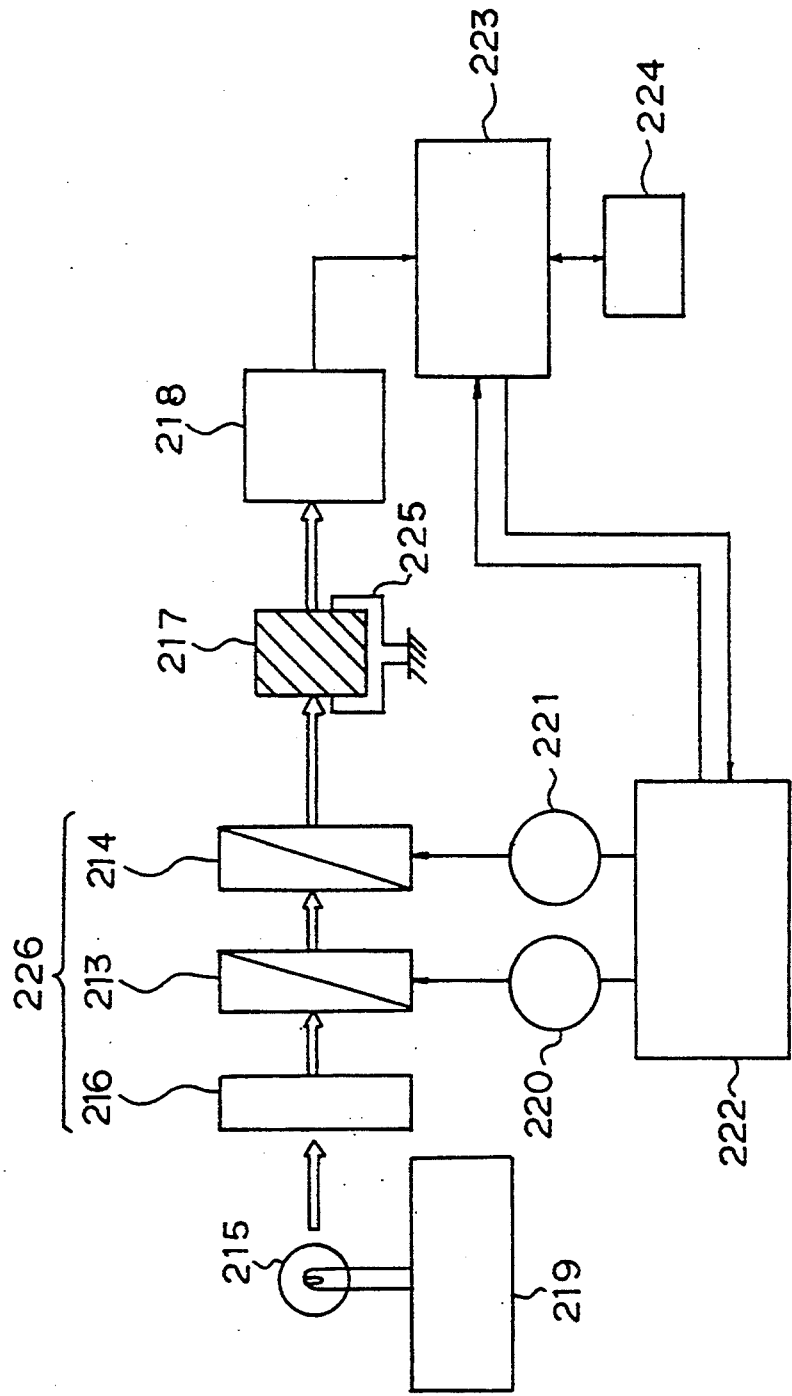

OPTICAL FIBER TYPE POLARIZER

FIELD OF THE INVENTION

The present invention relates to a polarizer that converts the state of polarization of light to linearly polarized light, and more particularly to an optical fiber type polarizer constructed by an optical fiber having a characteristic of double refraction. The present invention also relates to an apparatus and method for fabricating the optical fiber type polarizer. Further, the present invention relates to an inspection apparatus that is suitable for inspecting characteristics of the optical fiber type polarizer.

DESCRIPTION OF THE PRIOR ART

If, as shown in FIG. 38(a), the clad layer 27a of an optical fiber 27 is covered with an elliptical clad 27b, anisotropic stress can be applied steadily and continuously to the interior of the optical fiber, and a "birefringent optical fiber" having a characteristic of high double refraction can be made by photoelastic effect (when mechanical stress is applied to normally isotropic substances such as plastic or glass, photoelastic stress is produced and causes double refraction). Another example of a conventional birefringent optical fiber 28 is shown in FIG. 38(b). The fiber 28 is covered with a clad layer 28a having embedded therein elements 28b through which mechanical stress is applied.

If light passes through the birefringent optical fiber, it is to be resolved into a Y polarized wave component having an electric vector along the X axis and a X polarized wave component having an electric vector along the Y axis. By applying a predetermined bending force to the birefringent fiber (generally, by winding the fiber at a small radius on a reel), a large extinction ratio can obtained between the two polarized wave components, so that an "optical fiber type polarizer" can be produced which is less loss and higher operating performance than a conventional polarizer (e.g., birefringent prism) using a crystal such as calcite.

FIG. 39 illustrates a typical characteristic of wavelength of the light transmitted by the optical fiber type polarizer. As shown in this figure, the X polarized wave component is largely attenuated in a wavelength region of more than 800 nm (nanometer), while the Y polarized wave component starts attenuating at a wavelength of 1000 nm. That is, in the region A between a wavelength of 800 nm and a wavelength of 1000 nm, most of the X polarized wave component is disappeared and linearly polarized light having the Y polarized wave component only is to be transmitted.

The optical fiber type polarizer is used in various optical systems that require a single linearly polarized light beam. A typical example is an optical fiber gyro using the Sagnac effect that a time difference $\delta t$ between the time it takes a clockwise light beam to propagate through an optically closed circuit being rotating and the time it takes an counterclockwise light beam to propagate through the closed circuit is proportional to a rotational angular velocity $\Omega$ of the rotating closed circuit.

FIG. 40 is a block diagram used to explain the principles of a conventional optical fiber gyro. The optical fiber gyro comprises a light source 1, an optical fiber type polarizer 2, a first beam splitter 3a, a second beam splitter 3b, an optical fiber loop 4 (an optically closed circuit), a phase modulator 5, and a photodetector 6. A coherent light beam (e.g., laser beam) generated by the light source 1 is transmitted to the optical fiber type polarizer 2 and the photodetector 6 through the first beam splitter 3a. The light from the optical fiber type polarizer 2 is transmitted to the second beam splitter 3b, in which the coherent light beam is divided into a clockwise light beam $P_R$ and a counterclockwise light beam $P_L$. The clockwise light beam $P_R$ propagates clockwise through the optical fiber loop 4, while the counterclockwise light beam $P_L$ propagates counterclockwise through the optical fiber loop 4. The phase modulator 5 is provided between the beam splitter 3 and the optical fiber loop 4 so that the clockwise light beam $P_R$ is phase modulated after it propagates through the loop 4 and the counterclockwise light beam $P_L$ is phase modulated before it propagates through the loop 4.

After propagation, the intensities of the two light beams $P_R$ and $P_L$ transmitted from the beam splitter 3a are measured by the photodetector 6. The measurement values are proportional to a sine of phase difference of both light beams (sin $\delta\Phi$, $\delta\Phi=2\pi$(optical path length difference of clockwise and counterclockwise light beams)/wavelength), and the optical path length difference of clockwise and counterclockwise light beams is given in accordance with the Sagnac effect by equation (1):

$$\text{Optical path length difference} = c\delta t = 4A\Omega/c \quad (1)$$

where c is the speed of light and A is an area enclosed by the closed optical path (optical loop). Therefore, the rotational angular velocity $\Omega$ applied to the optical fiber loop 4 can be detected accurately, and an optical fiber gyro can be provided which is suitable for use in an inertial navigation system that detects the current location of a vehicle such as aircraft, ships and automobiles.

For element parts such as electronic parts and mechanical parts, it is generally required that a change of characteristics does not occur when they are mounted in a system, the production yield thereof is high and the inspection processing thereof is simple and accurate. These requirements are also applied to the optical fiber type polarizer which is one of the element parts.

FIG. 41 schematically illustrates a conventional optical fiber type polarizer. As described above, in the optical fiber type polarizer, it is necessary to apply a predetermined bending deformation to the birefringent optical fiber. For the optical fiber type polarizer shown in FIG. 41, a bending deformation has been applied steadily to the optical fiber 12 by winding it on a small-diameter bobbin holder 11. The winding start and winding end of the birefringent fiber 12 are fixed by an adhesive 13 (e.g., silicon adhesive).

When the optical fiber type polarizer is incorporated into an optical system such as an optical fiber gyro, the covering jacket of the end portion of the birefringent optical fiber 12 is removed and then there is required a fusing operation for firmly bonding the exposed end portion, which is comprised of a core portion and a clad portion, to the end of another optical fiber. Since in the fusing operation the axial alignment of the birefringent fiber whose core portion is very small in diameter is very difficult, the birefringent optical fiber 12 must be formed at the opposite end portions thereof with extra portions 12a and 12b so that the fusing operation can be performed again if it should fail. However, when such extra portions 12a and 12b are incorporated into the optical fiber gyro, they are inevitably subjected to external forces causing tensile, bending and torsional deformations. If such deformations are temporary deformation, there is no problem, but they remain unremoved depending on the positional relationship between individual components, working conditions and the like. As a result, there is the problem that the characteristics (loss, extinction ratio, etc.) of the optical fiber type polarizer are varied by the residual deformations.

For the purpose of preventing the external forces applied to the extra portions 12a and 12b from being transmitted to the wound portions of the birefringent fiber 12, the winding start and end of the birefringent fiber 12 are hardened with the adhesive 13. However, since the portion of the birefringent fiber 12 to be adhered is limited only to the winding start and end thereof, the prevention of the transmission of the external forces from the extra potions 12a and 12b to the wound portions of the fiber 12 is not always perfect. Therefore, if, for example, the extra portions 12a and 12b are subjected to torsional deformation or the adhesive 13 is not applied uniformly, the torsional deformation is transmitted to the winding start and end the fiber 12, so that the characteristics of the optical fiber type polarizer are varied.

In addition, in winding the birefringent optical fiber 12 on the bobbin holder 11, it is necessary to prevent torsion of the axial center of the optical fiber 12. A wellknown cable winding technique in which a cable is wound along a line marker marked on the cable along the cable center is applicable to the prevention of the optical fiber torsion. However, since in this technique the prevention of torsion is visually inspected and the optical fiber is much smaller in diameter than a general cable, the inspection is not always satisfactory, so that the aforementioned problem of the production yield cannot be solved.

The polarization characteristic of the optical fiber type polarizer itself can be inspected by a method such as that shown in FIG. 42. Light from a light source 20 passes through an optical fiber type polarizer 21 to be inspected. The transmitted light by the polarizer 21 then passes through an analyzer 22. Finally, the transmitted light by the analyzer 22 is detected by an optical detector 23. The maximum light quantity $P_{max}$ and the minimum quantity $P_{min}$ of the transmitted light are measured. The minimum light quantity $P_{min}$ of the transmitted light is one which is obtained by rotating the analyzer 22 by 90° from the main axis direction thereof as $P_{max}$ was measured. A ratio of $P_{max}$ and $P_{min}$ is defined as an extinction ratio.

A conventional inspection method such as that shown in FIG. 42, however, has the disadvantages that an accurate extinction ratio cannot be measured in a case where, as shown in FIG. 43, optical elements 25 and 28 such as a single-mode optical fiber are attached to the both sides of the polarizer 24. That is, in general, even if incident light were linearly polarized light, an optical coupling between two orthogonal polarized components crossing each other would occur in the inside of the optical fiber, so that the state of polarization of the light transmitted from the optical fiber becomes elliptically polarized light. The same problem occurs undoubtedly of an anisotropic optical fiber, and also occurs even in case of an isotropic optical fiber, because it has a slight anisotropy due to stresses produced during manufacture. Therefore, even if $P_{max}$ and $P_{min}$ are measured with the construction of FIG. 43, the values measured would be based on elliptically polarized light, so that the values do not represent the extinction ratio of the polarizer 24 accurately.

It is, accordingly, an important object of the present invention to provide an optical fiber type polarizer which does not change in its characteristics when incorporating into an optical system.

It is another important object of the present invention to provide an optical fiber type polarizer whose production yield is high.

It is still another important object of the present invention to provide a simple and accurate inspection method of inspecting a polarizer (particularly, an optical fiber type polarizer) that is connected to other optical medium when the polarizer is incorporated into an optical system.

SUMMARY OF THE INVENTION

In accordance with one important aspect of the present invention, there is provided an optical fiber type polarizer comprising a birefringent optical fiber having a winding start and a winding end, the birefringent fiber being wound at a predetermined radius and the winding start and end being fixed by an adhesive, a first optical fiber being spliced such as by being fusion connected to a short extra portion extending from the winding start, and a second optical fiber being spliced such as by being fusion connected to a short extra portion extending from the winding end. In this structure, the length of the extra portions that are easily subjected to bending and torsional deformation can be made as short as possible. Consequently, in the working condition and the like as the optical fiber type polarizer is incorporated into an optical system, it is not necessary to take an occurrence of unexpected loss into consideration. For this reason, the design and fabrication requirements can be alleviated, so that an optical fiber type polarizer can be provided which can be easily incorporated into an optical system. In addition, the required length of an expensive birefringent fiber (over ten times higher in price than a single-mode optical fiber) can be reduced to a minimum and accordingly the overall production cost thus reduced.

In a case where each of the first and second optical fiber comprises a second birefringent optical fiber, the second birefringent fiber is smaller in index of double refraction than the birefringent fiber wound at the predetermined radius.

In accordance with another important aspect of the present invention, there is provided an optical fiber type polarizer comprising a bobbin holder, a birefringent optical fiber having a winding start and a winding end, the birefringent fiber being wound at a predetermined radius on the bobbin holder and the winding start and end being fixed by an adhesive, a first optical fiber being spliced such as by being fusion connected to a short extra portion extending from the winding start, arid a second optical fiber being spliced such as by being fusion connected to a short extra portion extending from the winding end.

The bobbin holder may have members mounted at the opposite ends thereof. In such case, the short extra portion extending from the winding start and the short extra portion extending from the winding end are fixed on the members.

The birefringent optical fiber wound on the bobbin holder may have a cross section other than a circular shape.

The bobbin holder may have a cylindrical body formed at its outer surface with a recess extending in an axial direction of the cylindrical body, and the cylindrical body may be made from an elastic member.

In accordance with another important aspect of the present invention, there is provided a method of fabricating an optical fiber type polarizer comprising the steps of passing a birefringent optical fiber having a cross section other than a circular shape through an aperture having the same cross section as that of the birefringent optical fiber, and winding the birefringent optical fiber on a bobbin holder having a predetermined diameter.

In accordance with another important aspect of the present invention, there is provided an apparatus for inspecting a polarizer, comprising optical means for introducing a variable phase difference between two polarized wave components of linearly polarized light crossing at right angles and for giving a variable rotation of a plane of polarization between the two polarized wave components, and means for calculating an extinction ratio of the polarizer from a ratio of the maximum and minimum values of a light intensity of the linearly polarized light transmitted through an inspection sample including the polarizer. The polarizer may comprise an optical fiber type polarizer.

In accordance with still another important aspect of the present invention, there is provided an apparatus for fabricating an optical fiber type polarizer, comprising a supply drum for feeding a birefringent optical fiber, and a bobbin holder on which the birefringent optical fiber fed by the supply drum is wound, the birefringent fiber having a slackened portion between the supply drum and the bobbin holder.

Since the tension of the slackened portion of the birefringent fiber becomes substantially zero, twists in the birefringent fiber can be removed by the restoring force of the fiber itself. The removal ability of twists depends upon the length of the slackened portion of the birefringent fiber, so it is preferable to make the slackened portion as long as possible. If the supply drum is moved in the axial direction thereof so that the birefringent fiber being unwound from the supply drum becomes straight, an occurrence of twists can be prevented.

In accordance with a further important aspect of the present invention, there is provided a method of fabricating an optical fiber type polarizer, comprising the steps of winding a birefringent optical fiber on a bobbin holder, the fiber having a winding start and a winding end, fixing the winding start and end of the birefringent optical fiber on the bobbin holder by an adhesive, immersing the bobbin holder in resin solution, and removing the bobbin holder from the resin solution and then placing the removed bobbin holder on a base plate.

In this fabrication method, the fixation of the bobbin holder and the fixation of the short extra portions extending from the winding start and end of the birefringent fiber can be made at the same time by simple steps of immersing the bobbin holder in the resin solution, placing the bobbin holder on the base plate and hardening the resin around the bobbin holder. Therefore, the time needed for fabrication can be shortened and the working efficiency thus enhanced.

BRIEF DESCRIPTION OF THE DRAWINGS

The drawbacks of a conventional optical fiber type polarizer and the features and advantages of an optical fiber type polarizer according to the present invention will be more clearly understood from the following description taken in conjunction with the accompanying drawings in which:

FIG. 32 is a schematic diagram illustrating one modification of the inspection apparatus according to the eighth embodiment of the present invention;

DESCRIPTION OF THE PREFERRED EMBODIMENTS

Figure 1:
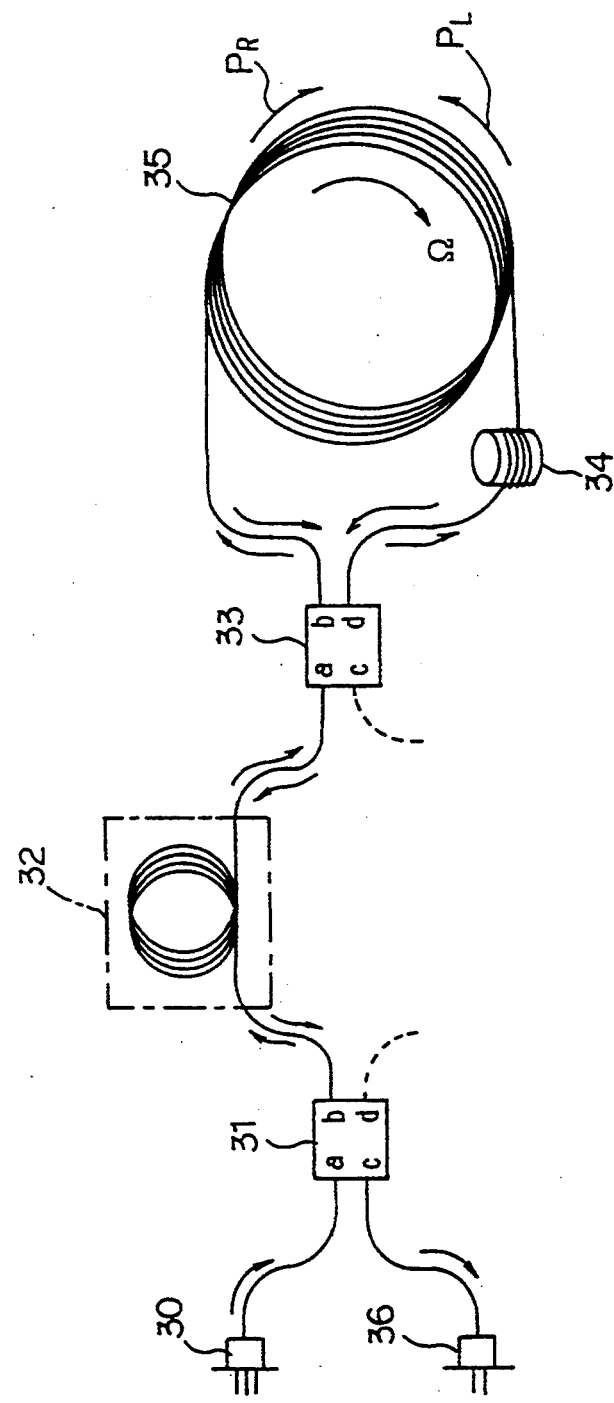
FIG. 1 is a schematic view showing an optical fiber gyro into which an optical fiber type polarizer may be incorporated.

FIG. 1 schematically illustrates an optical fiber gyro into which an optical fiber type polarizer may be incorporated. The optical fiber gyro comprises a light source 30 for generating a coherent light beam such as a laser beam, a first optical two-branch coupler 31, an optical fiber type polarizer 32, a second optical two-branch coupler 33, a phase modulator 34, an optical fiber loop 35, and a photodetector 36. The second optical two-branch coupler 33 has a light branch function of branching an incident light beam of the terminal a into two light beams. The two light beams are outputted through the terminals b and d of the second coupler 33. The second optical two-branch coupler 33 also has a light coupling function of coupling two incident light beams of the terminals b and d. The coupled light beam is outputted through the terminal a and c of the second optical coupler 33. Likewise, the first two-branch coupler 31 has the same branch and coupling functions as the second coupler 33, but in this embodiment it is used for connecting the terminals a and b and connecting the terminals c and d.

The laser beam from the light source 30 is transmitted through the first optical two-branch coupler 31 to the optical fiber type polarizer 32, in which the laser beam is linearly polarized. The linearly polarized light beam from the polarizer 32 is branched into two light beams by the second optical two-branch coupler 33. The branched light beam from the terminal b propagates through the optical fiber loop 35 in the clockwise direction shown in FIG. 1 and returns to the terminal d, while the branched light beam from the terminal d propagates through the optical fiber loop 35 in the counterclockwise direction and returns to the terminal b. The clockwise light beam $P_R$ from the terminal b and the counterclockwise light beam $P_L$ from the terminal d are given the same phase quantities by the phase modulator 34 to make both light beams equal in phase.

A phase difference proportional to a rotational angular velocity $\Omega$ of the optical fiber loop 35 occurs between the clockwise light beam $P_R$ and the counterclockwise light beam $P_L$. Therefore, if a quantity of light of the coupled light beam from the terminal a of the second two-branch coupler 32 is measured, the aforementioned rotational angular velocity $\Omega$ can be detected from the measurement value.

Figure 2:
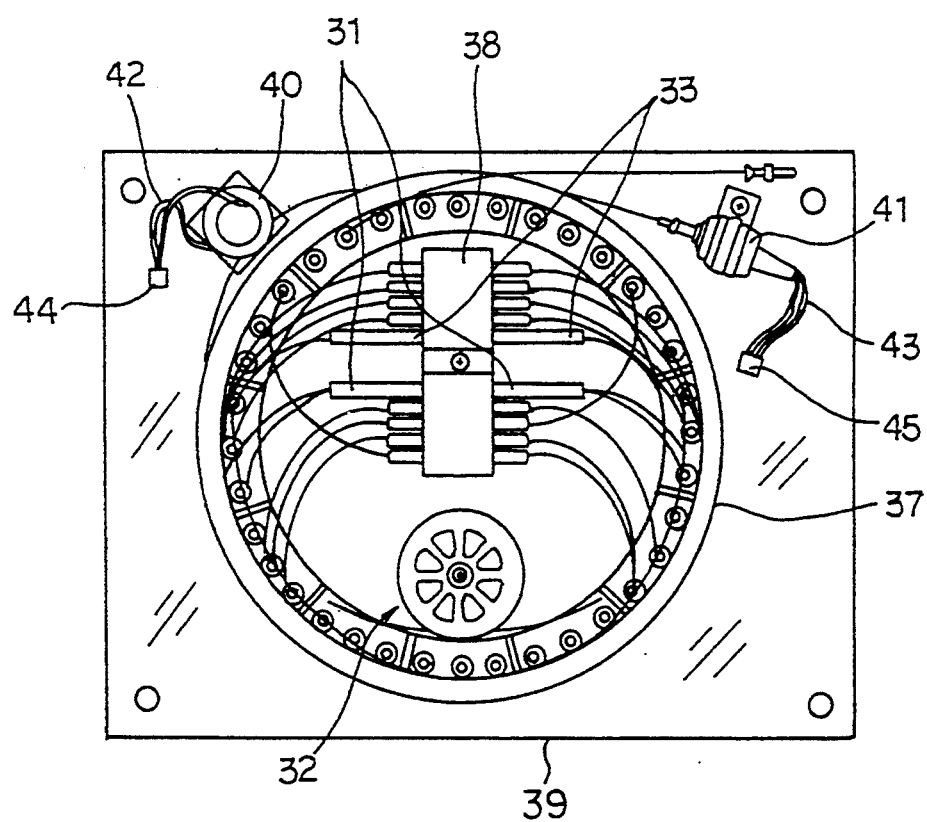
FIG. 2 is a plan view showing the optical fiber gyro in its assembly state.

FIG. 2 illustrates the optical fiber gyro in its assembly state. The optical fiber type polarizer 32 is housed in a bobbin 37 of the optical fiber loop, and the size of the optical fiber type polarizer 32 is much smaller than the loop diameter of the optical fiber loop wound on the outer surface of the bobbin 37. Reference numeral 38 denotes a plate member on which the first and second couplers 31 and 33 are attached and the spliced portions of fibers are fixedly mounted. Reference numeral 39 denotes a base plate on which the optical fiber gyro is mounted. 40 is a phase modulator and 41 a light emitting module. 42, 43 are cable harnesses, and 44, 45 connectors.

Figure 3:
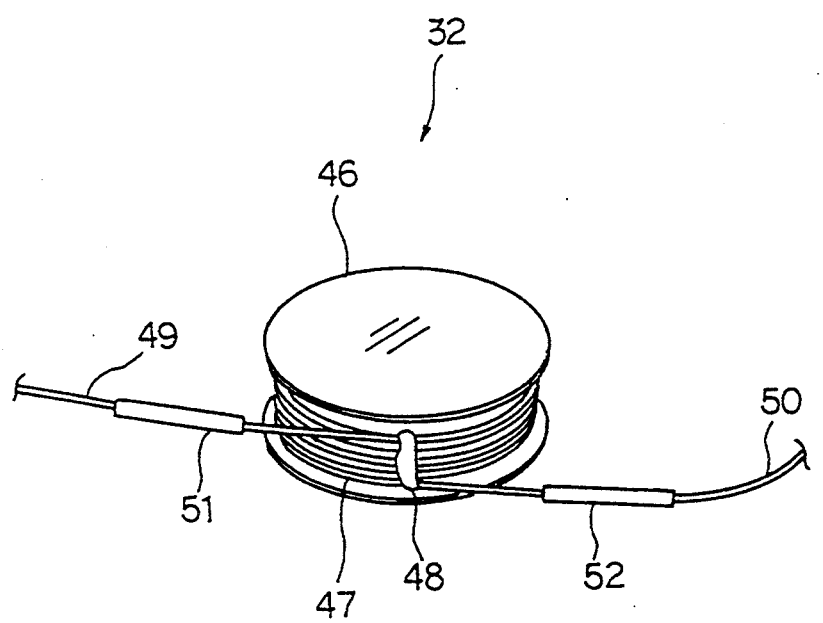
FIG. 3 is a perspective view showing the optical fiber type polarizer of FIG. 1.

FIG. 3 illustrates the external appearance of the optical fiber type polarizer 32. The optical fiber type polarizer 32 is similar to the conventional optical fiber type polarizer of FIG. 41 in that a birefringent optical fiber 47 is wound on a small-diameter bobbin holder 46 and the winding start and end of the fiber are hardened by an adhesive 48, but it is different in that the birefringent fiber 47 has at its opposite end portions almost no extra portions, as compared with the long extra portions 12a and 12b of the conventional polarizer of FIG. 41. That is, the optical fiber type polarizer 32 of the FIG. 3 embodiment is cut so that the portions extending from the winding start and end thereof become a short length (e.g., a length substantially equal to the winding radius). These short portions extending from the winding start and end are connected to the ends of other optical fibers 49 and 50 through fused portions 51 and 52. The optical fibers 49 and 50 to be connected to the optical fiber type polarizer 32 can be constituted by an arbitrary optical fiber such as a single-mode optical fiber. However, in a case where birefringent fibers are used, they must be smaller in index of double refraction (B-value) than the birefringent fiber 47 wound on the bobbin holder 46.

The diameter of the bobbin holder 46 is sized so that the birefringent fiber 47 is given a necessary bending deformation for obtaining a desired extinction ratio. The size of the necessary bending deformation, that is, the winding diameter of the birefringent fiber 47 is mainly determined by the B-value (index of double refraction) of the birefringent fiber 47. For example, in the case that the B-value is a large one such as $10 \times 10^{-4}$, a desired extinction ratio can be obtained with a small bending deformation, but the size of the bobbin holder 46 is increased. On the other hand, in the case that the B-value is small, the size of the bobbin holder 46 can be decreased, but the number of winding times is increased. Therefore, if the size of the bobbin holder 46 is an important problem, a small B-value can be selected, and if an increase in the number of winding times is an important problem, a large B-value can be selected.

In the structure as described above, consider the case that each of the optical fibers 49 and 50 to be connected to the optical fiber type polarizer 32 comprises a single-mode optical fiber. In general, a single-mode optical fiber is far stronger in bending durability than a birefringent optical fiber and can endure buckling load several tens times larger than the fiber diameter. Therefore, even if an external force causing tensile, bending and torsional deformations were exerted on the single-mode optical fibers 49 and 50 when incorporating the optical fiber type polarizer 32 into an optical system, the optical fibers 49 and 50 would not change in their characteristics and accordingly the characteristics (loss, extinction ratio, etc.) of the optical fiber type polarizer 32 can be stabilized. On the other hand, in the case that the optical fibers 49 and 50 comprise birefringent optical fibers, there is the possibility that the fibers 49 and 50 change in their characteristics due to an external force produced when they are incorporated into a system, but by making their indices of double refraction (B-value) minimum, a degree of changes in the characteristics can be minimized. The reason is because, if the B-value is made small, a limit winding radius causing characteristic changes of a birefringent optical fiber will change in a direction of making the limit winding radius smaller.

A method of fabricating the optical fiber type polarizer 32 of the present invention will hereinafter be described in conjunction with FIG. 4.

Before winding on the bobbin holder 46, the birefringent optical fiber 47 is spliced by being fusion connected at one end thereof with the optical fiber 49 and optically coupled at the other end with a photodetector 54 through an analyzer 53. In this embodiment, the optical fiber 47 to be connected to the polarizer 32 comprises a single-mode optical fiber. In a case where the birefringent fiber 47 is too long and must have a looped portion, the diameter of the looped portion must be increased to the extent that the looped portion do not become a polarizer.

After the preparation operation, the birefringent fiber 47 is wound on the bobbin holder 46 from the vicinity of a fused portion 51. When the birefringent fiber 47 is wound on the bobbin holder 46 and reaches about a predetermined length, the quantity of attenuation and the extinction ratio are measured. The measurement of the extinction ratio is made by propagating unpolarized light $P_I$ through the optical fiber 49 and by obtaining a ratio of the minimum value $P_{min}$ to the maximum value $P_{max}$ ($P_{min}/P_{max}$) of the output light $P_O$ of the analyzer 53 as it was made one revolution. The quantity of attenuation is obtained by calculating $\{1-(2P_{max}/P_I)\}$. The reason why the characteristics of the optical fiber type polarizer 32 are thus inspected is that generally the winding diameter and number of winding times of an optical fiber type polarizer are designed in advance, but in fact there are many fluctuations in the characteristics of the birefringent fiber 47, and that if the inspection is made before completion, an occurrence of inferior goods can be prevented by some method such as rewinding and therefore production yield can be improved.

If the inspection is satisfactory, the birefringent fiber 47 is cut at a position 55 in the vicinity of the winding end of the fiber 47. The cut end of the birefringent fiber 47 is then unwound from the bobbin holder 46 to be fusion connected with the end of another optical fiber (not shown). After the splice, the unwound portion of the fiber 47 is wound on the bobbin holder 46 again, and the winding start and end of the fiber 47 are hardened by an adhesive. In this way, the optical fiber type polarizer 32 is completed. This fabrication method of the optical fiber type polarizer 32 is different from a conventional optical fiber type polarizer such as that shown in FIG. 41 in which the connection of a birefringent fiber with another optical fiber is made when incorporating into an optical system, and is characterized in that the connection of the birefringent fiber 47 with the optical fiber 49 is completed in the step of fabrication. Therefore, by the fabrication method of the present invention, there can be provided the optical fiber type polarizer 32 in which the extra portions of the birefringent fiber 47 that are easily subjected to bending deformation can be made as short as possible.

Figure 4:
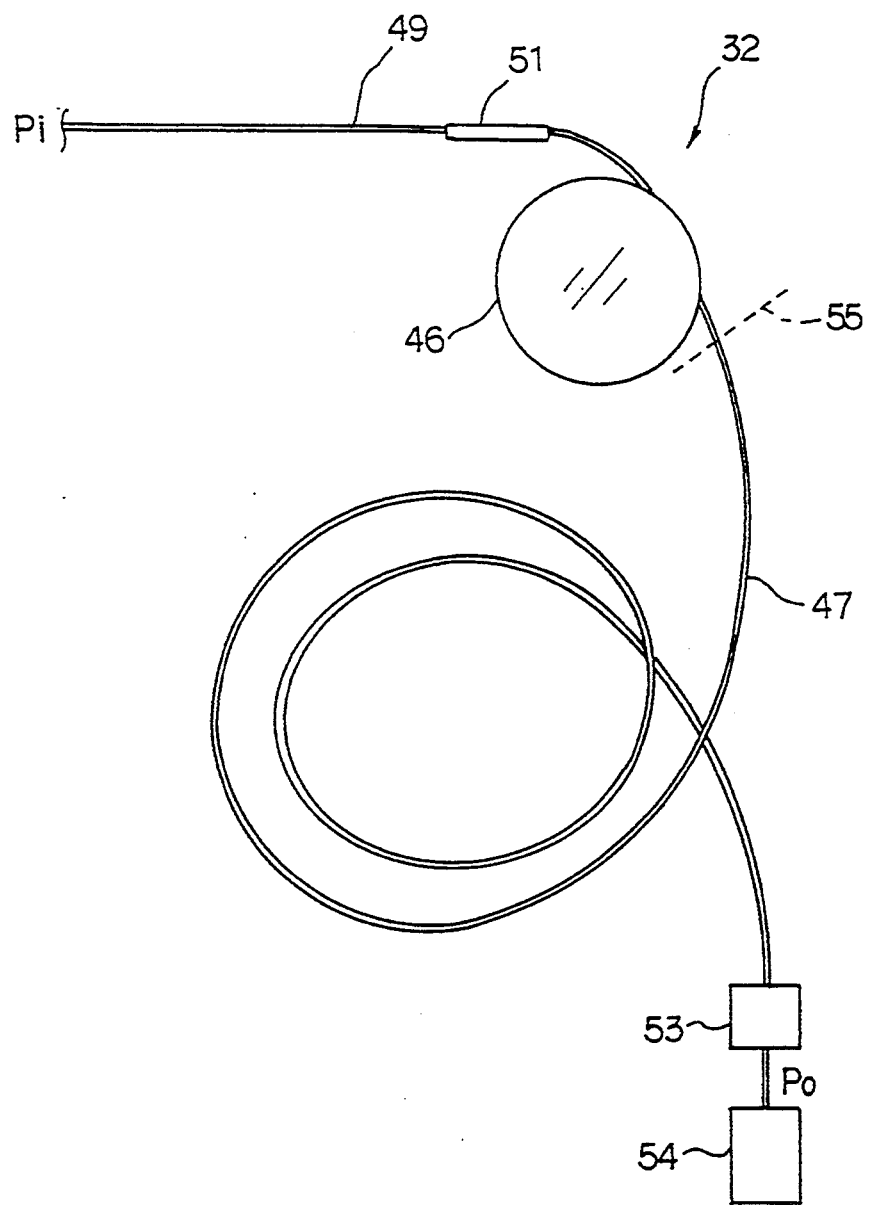
FIG. 4 is a diagram used to explain a method of fabricating the optical fiber type polarizer.

Although in the fabrication method shown in FIG. 4 the other end of the birefringent fiber 47 is connected with the other optical fiber after inspection, it is noted that the aforementioned winding, inspection and re-winding may also be performed after the birefringent fiber 47 has been connected at opposite ends with the two optical fibers. In this case, an accurate extinction ratio can be measured by an inspection method to be described later.

Figure 5:
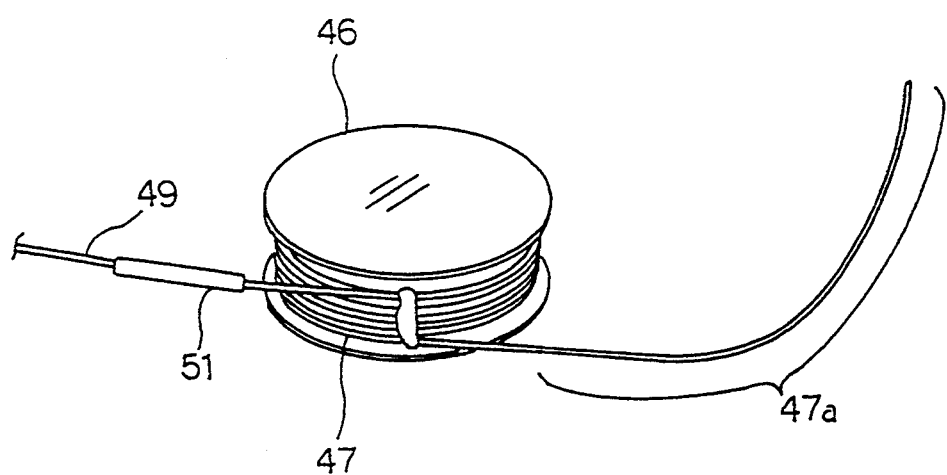
FIG. 5 is a perspective view showing a modification of the optical fiber type polarizer of FIG. 3.
Figure 6:
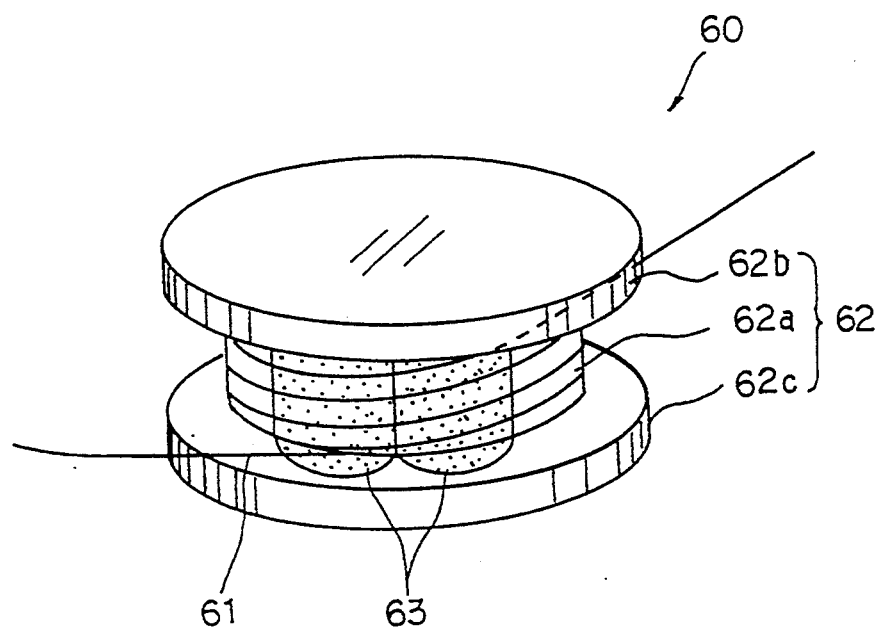
FIG. 6(a) is a perspective view showing a second embodiment of the optical fiber type polarizer according to the present invention.
FIG. 6(b) is a plan view showing the optical fiber type polarizer of FIG. 6(a)
Figure 6:
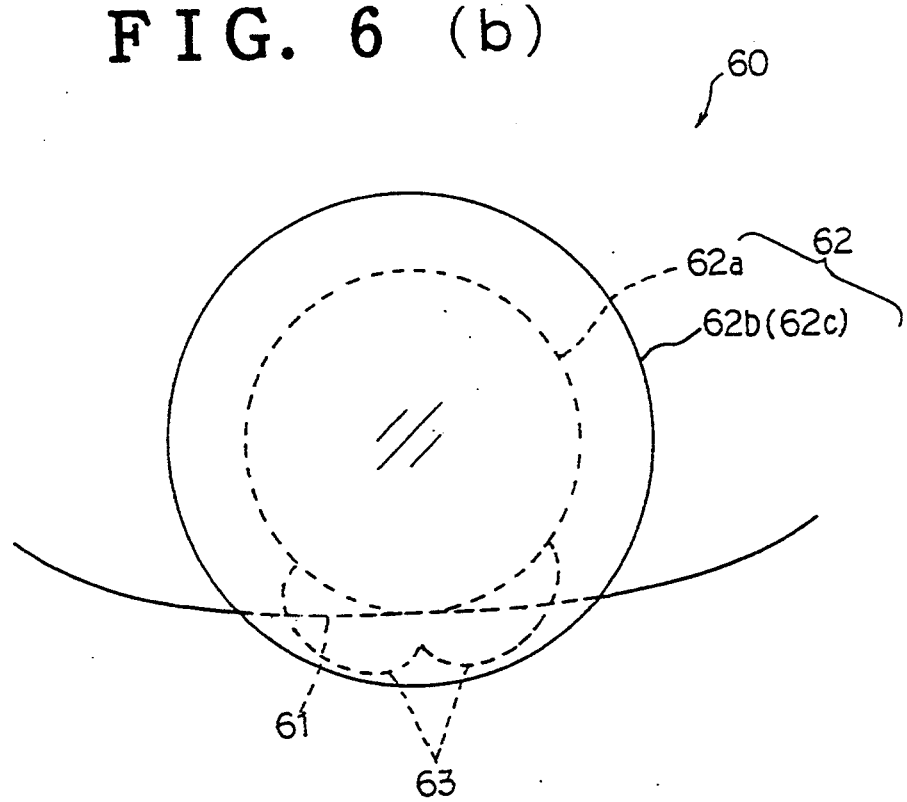
Figure 7:
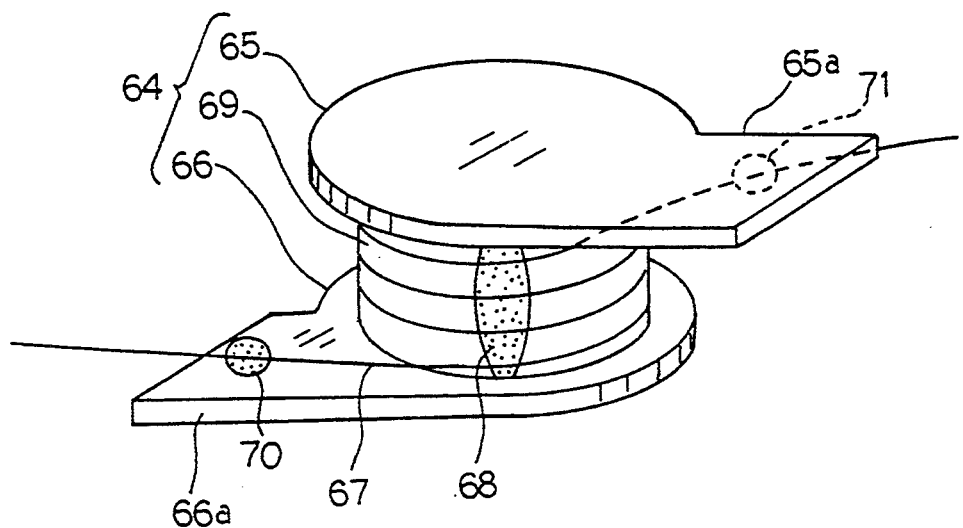
FIG. 7(a) is a perspective view showing one modification of the optical fiber type polarizer of FIG. 6(a)
FIG. 7(b) is a plan view showing the optical fiber type polarizer of FIG. 7(a)
Figure 7:
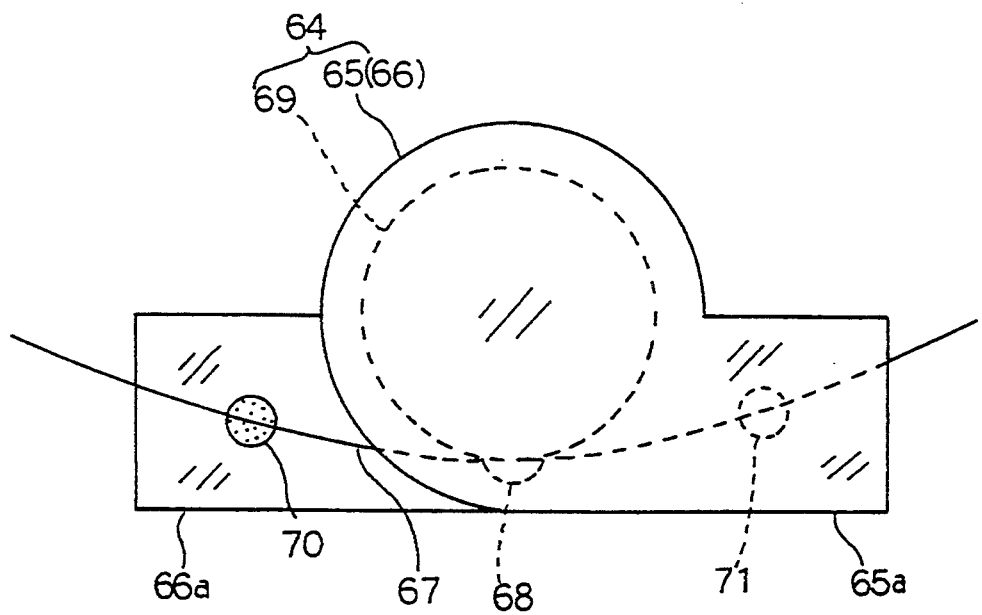
Figure 8:
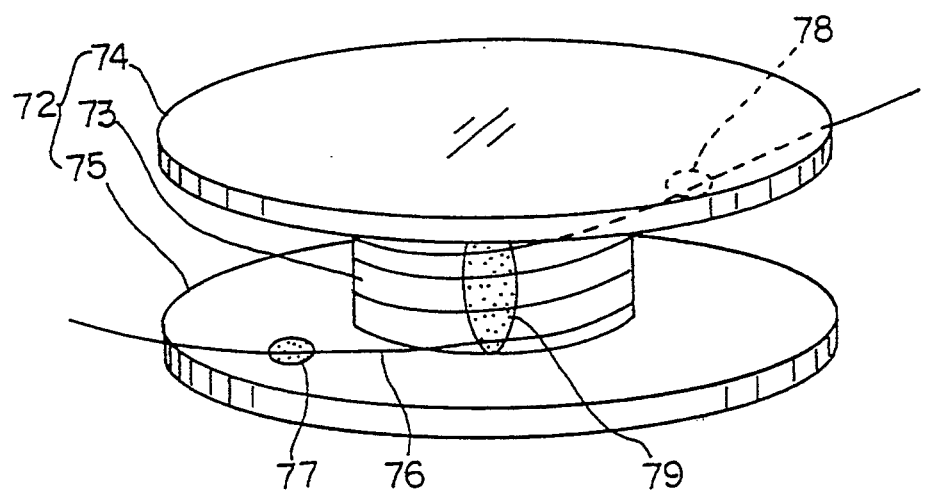
FIG. 8(a) is a perspective view showing another modification of the optical fiber type polarizer of FIG. 6(a)
FIG. 8(b) is a plan view showing the optical fiber type polarizer of FIG. 8(a)
Figure 8:
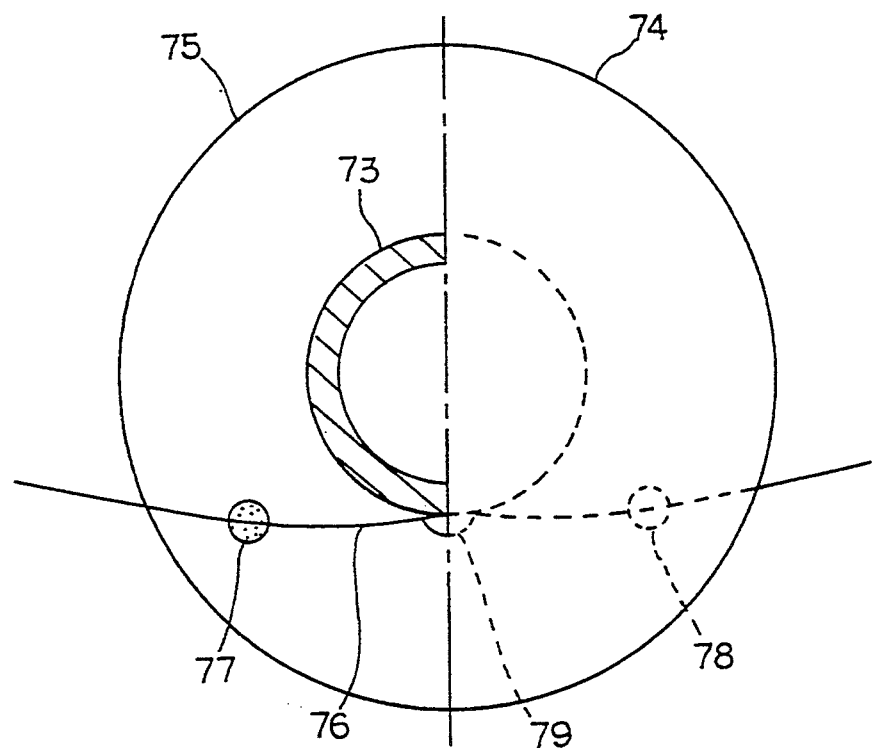
Figure 9:
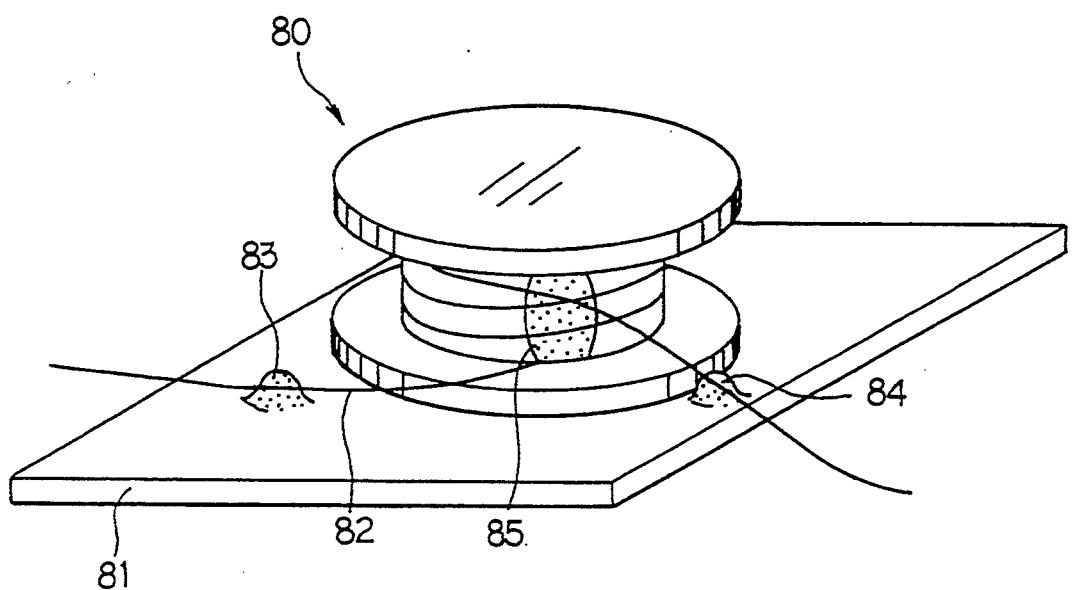
FIG. 9(a) is a perspective view showing another modification of the optical fiber type polarizer of FIG. 6(a)
FIG. 9(b) is a plan view showing the optical fiber type polarizer of FIG. 9(a)
Figure 9:
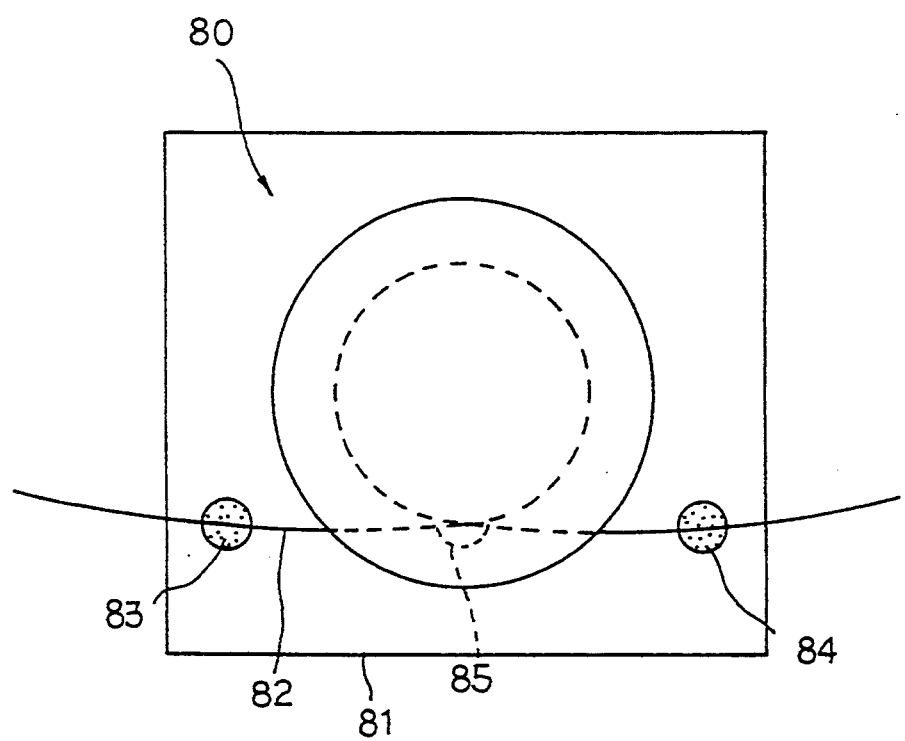
Figure 41:
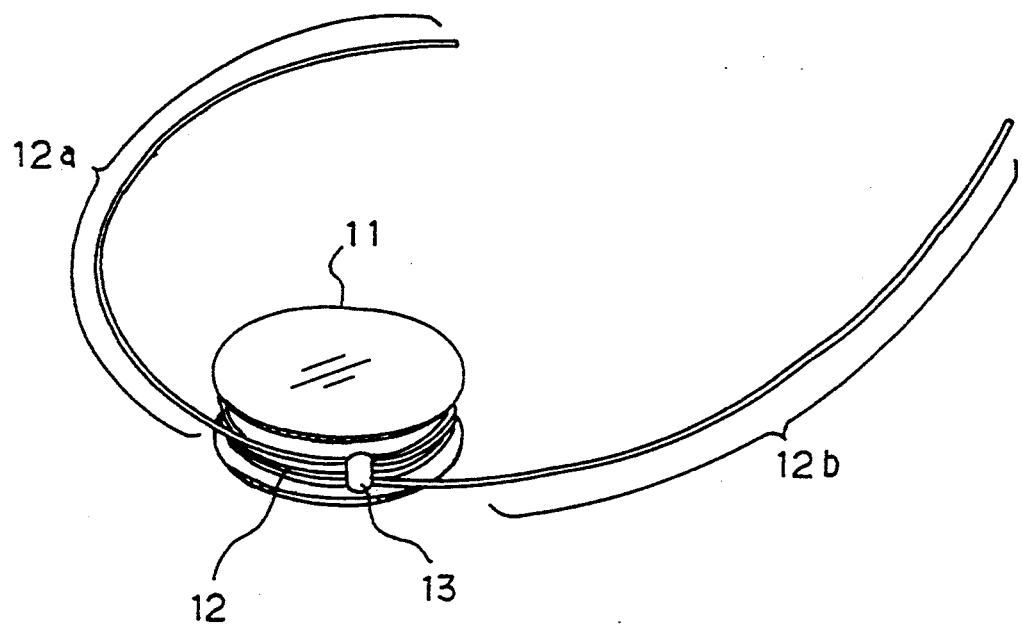
FIG. 41 is a schematic view illustrating a conventional optical fiber type polarizer.
Figure 42:
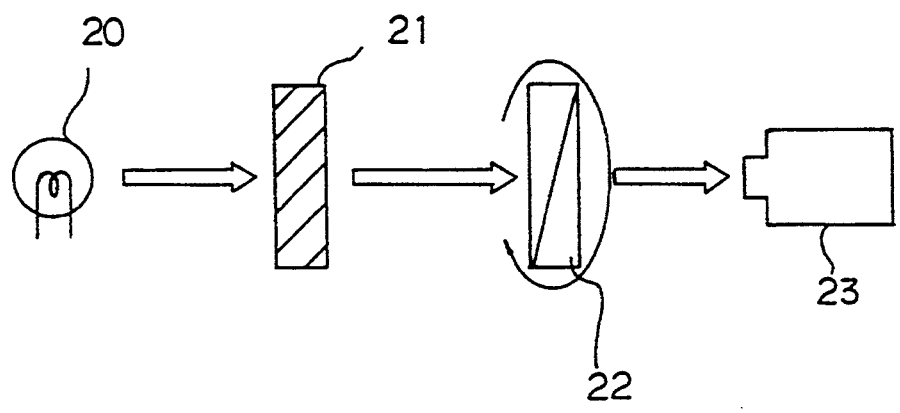
FIG. 42 is a schematic view illustrating a conventional polarization characteristic inspection method in which the polarization characteristic of the optical fiber type polarizer is inspected.
Figure 43:
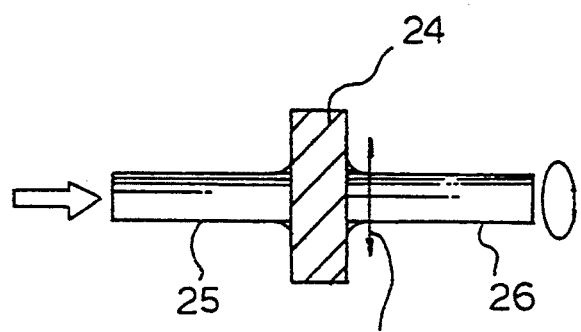
FIG. 43 is a diagram used to explain problems inevitably inherent in the conventional method of FIG. 42.

In addition, as shown in FIG. 5, one end of the birefringent fiber 47 can be fusion connected to the optical fiber 49, and the other end can be formed as an extra portion 47a, like the prior art shown in FIG. 41. In this case the characteristic change in at least the one end of the birefringent fiber 47 can be prevented.

The present invention is not limited to the embodiments described above. For example, the birefringent fiber 47 can be formed into a loop shape without using the bobbin holder 46. The connection of the birefringent fiber 47 with the other optical fibers 49 and 50 can also be made by a connector connection, V-shaped connection or a sleeve connection, instead of the fusion connection.

As described above, in the optical fiber type polarizer and the fabrication method therefor shown in FIGS. 1-5, the length of the extra portions that are easily subjected to bending and torsional deformation can be made as short as possible. Consequently, in the working condition and the like as the optical fiber type polarizer is incorporated into an optical system, it is not necessary to take an occurrence of unexpected loss into consideration. For this reason, the design and fabrication requirements can be alleviated, so that an optical fiber type polarizer can be provided which can be easily incorporated into an optical system. In addition, the required length of an expensive birefringent fiber (over ten times higher in price than a single-mode optical fiber) can be reduced to a minimum and accordingly the overall production cost thus reduced.

FIGS. 6-10 illustrate a second embodiment of the optical fiber type polarizer that is suitable for use in an optical system such as an optical fiber gyro.

An optical fiber type polarizer 60 shown in FIG. 6(a) is similar to the first embodiment shown in FIGS. 1-5 in that a birefringent optical fiber 60 is wound on a bobbin holder 62, but it is different in a method in which the winding start and end of the birefringent fiber 60 are fixed. That is, the bobbin holder 62 comprises a small-diameter cylindrical body 62a made from resin or metal material and two circular plates 62b and 62c fixedly mounted on the opposite ends of the cylindrical body 62a. The plates 62b and 62c are not limited to a circular shape. Further, the winding start and end of the birefringent fiber 60 is fixedly mounted on an outer surface 62a of the bobbin holder 60 and also on the plates 62b and 62c by an adhesive 63. The adhesive 63 is applied between the plates 62 without space and adjusted in thickness so that the short extra portions of the birefringent fiber 61 in the vicinity of the winding start and end are covered. Note that the short extra portions of the birefringent fiber 61 fixed by the adhesive 63 must be fixed along a circular arc having a radius of curvature larger than that of the cylindrical body 62a. In the case that the radius of curvature is infinite, it is necessary to fix the short extra portions along a straight line.

In the structure as described above, the short extra portions of the birefringent fiber 61 extending from the winding start and end are fixed along a radius of curvature (or a straight line) larger than that of the cylindrical body 62a. Therefore, even if an external force such as tension, bending and torsion is exerted on the birefringent fiber 61 when incorporating into an optical system, the transmission of this external force could be interrupted by the fixed portion of the short extra portions. Thus, the transmission of an external force to the wound portion of the birefringent fiber 61 is avoided, so an optical fiber type polarizer can be provided which can be easily incorporated into an optical system.

Preferred modifications of the second embodiment shown in FIGS. 6(a) and 6(b) will hereinafter be described in conjunction with FIGS. 7-10.

In the structure shown in FIGS. 7(a) and 7(b), a bobbin holder 64 comprises a first plate 65 formed with an extended portion 65a extending in one direction and a second plate 66 formed with an extended portion 66a extending in the opposite direction. The winding start and end of a birefringent optical fiber 67 are fixed on a cylindrical body 69 by an adhesive 68. The short extra portions of the birefringent optical fiber 67 extending from the winding start and end are fixedly mounted on the extended portions 65a and 66a by adhesives 71 and 70, respectively. Since the extended portions 65a and 66a are disposed in the tangential directions of the outer surface of the cylindrical body 69, the short extra portions can be fixed so that they are disposed along a substantially straight line and therefore the transmission of an external force can be prevented by the portions between the fixed points 70 and 68 and between the fixed point 68 and 71. Thus, the influence of an external force on the birefringent fiber 67 wound on the cylindrical body 69 is eliminated, and there is little change in the characteristics of the birefringent fiber 67 caused by the external force.

In the structure shown in FIGS. 8(a) and 8(b), a bobbin holder 72 comprises a cylindrical body 73 and a pair of large-diameter plates 74 and 75 mounted on the cylindrical body 73. The winding start and end of a birefringent optical fiber 76 are fixed on the cylindrical body 73 by an adhesive 79. The short extra portions of the birefringent optical fiber 76 extending from the winding start and end are fixedly mounted on the plates portions 74 and 75 by adhesives 78 and 77, respectively, as shown in 8(b). Like the embodiment of FIGS. 7(a) and 7(b), the short extra portions of the birefringent fiber 76 are also fixed so that they are disposed along a substantially straight line.

In the structure shown in FIGS. 9(a) and 9(b), a bobbin holder 80 is fixedly mounted on a base plate 81, and comprises a conventional one. The winding start and end a birefringent optical fiber 82 are fixed by an adhesive 85. The short extra portions of the birefringent optical fiber 82 extending from the winding start and end are fixedly mounted on the base plate 81 by adhesives 83 and 84, as shown in FIG. 9(b). In addition that the short extra portions of the birefringent fiber 82 are fixed so that they are disposed along a substantially straight line, there is the advantage that a conventional bobbin holder can be used without modification.

Figure 10A:
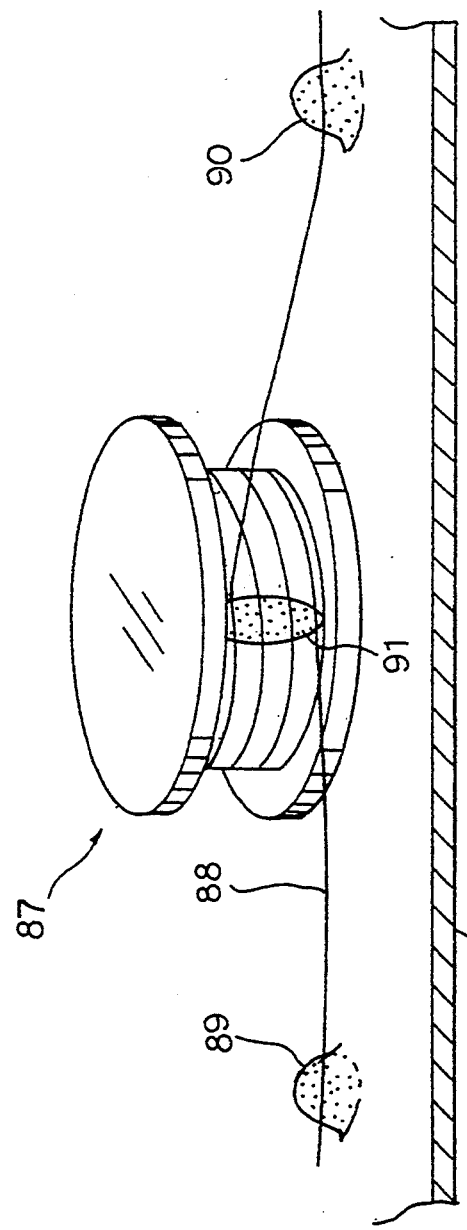
FIG. 10(a) is a perspective view showing another modification of the optical fiber type polarizer of FIG. 6(a)
Figure 10B:
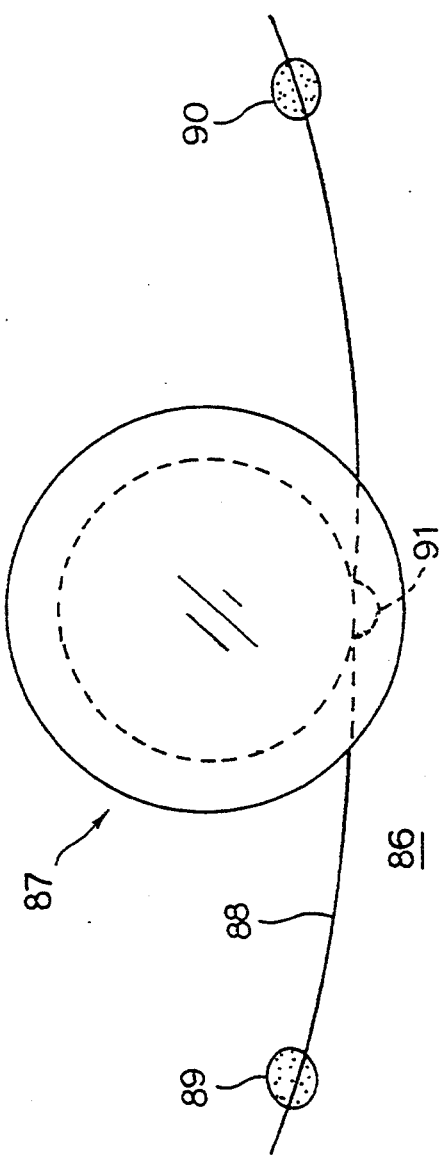
FIG. 10(b) is a plan view showing the optical fiber type polarizer of FIG. 10(a)
Figure 11:
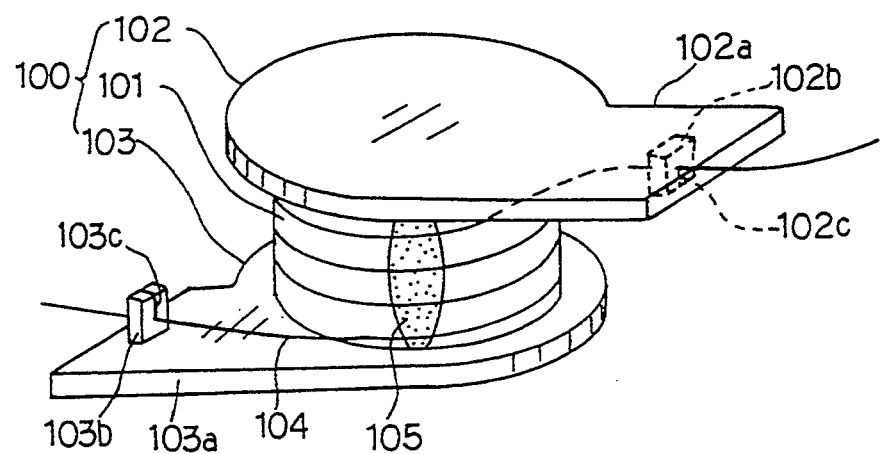
FIG. 11(a) is a perspective view showing a third embodiment of the optical fiber type polarizer according to the present invention.
FIG. 11(b) is a plan view showing the optical fiber type polarizer of FIG. 11(a)
Figure 11:
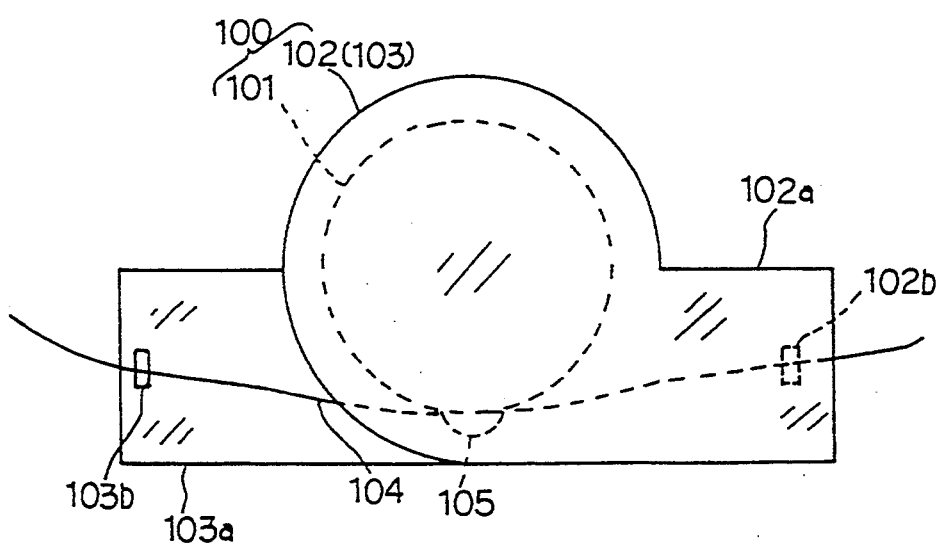

In the structure shown in FIGS. 10(a) and 10(b), a bobbin holder 87 is fixedly mounted on a frame structure 86 (or a member integrally formed in the frame structure) housing therein an optical system such as an optical fiber gyro. The winding start and end of a birefringent optical fiber 88 are fixed on the bobbin holder 87 by an adhesive 91. The short extra portions of the birefringent optical fiber 88 extending from the winding start and end are fixedly mounted on the frame structure 86 by adhesives 89 and 80, as shown in FIG. 9(b). As in the case of the embodiments described above, the short extra portions of the birefringent fiber 88 can fixed so that they ape disposed along a substantially straight line.

A third embodiment of the optical fiber type polarizer according to the present invention will hereinafter be described in conjunction with FIGS. 11-19.

FIG. 11(a) is a perspective view showing the third embodiment of the optical fiber type polarizer according the present invention. FIG. 11(b) is a plan view showing the optical fiber type polarizer of FIG. 11(a). In these figures, a bobbin holder 100 comprises a small-diameter cylindrical body 101, and first and second plates 102 and 103 mounted on the opposite ends of the cylindrical body 101. The first plate 102 is formed with an extended portion 102a extending in one direction, and the second plate 103 is formed with an extended portion 103a extending in the opposite direction. The extended portions 102a and 103a have small projections 102b and 103b mounted thereon, respectively. The projections 102b and 103b are formed with recesses 102c and 103c, respectively. Each of the recesses 102c and 103c is formed into a predetermined shape. The winding start and end of a birefringent optical fiber 104 are fixed on the cylindrical body 101 by an adhesive 105. The short extra portions of the birefringent optical fiber 104 extending from the winding start and end are inserted and fixed in the recesses 102c and 103c formed in the projections 102b and 103b.

Figure 12:
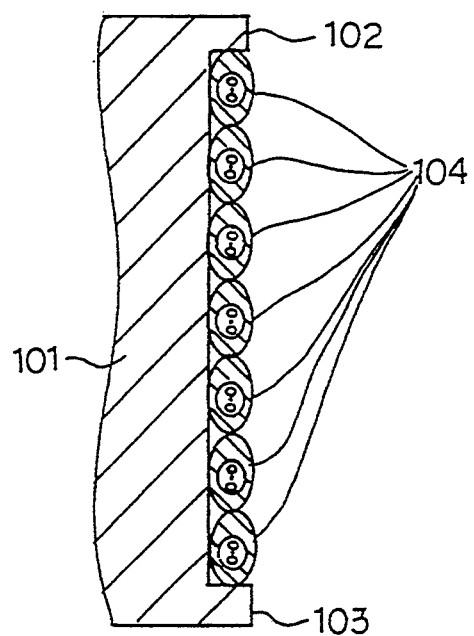
FIG. 12 is a part-sectional view of the bobbin holder of the optical fiber type polarizer of FIG. 11(a)

FIG. 12 is a part-sectional view of the bobbin holder 100 of the optical fiber type polarizer of FIG. 11(a). As shown in this figure, the birefringent fiber 104 having an elliptical cross section is wound on the cylindrical body 101 of the bobbin holder 100.

Figure 13:
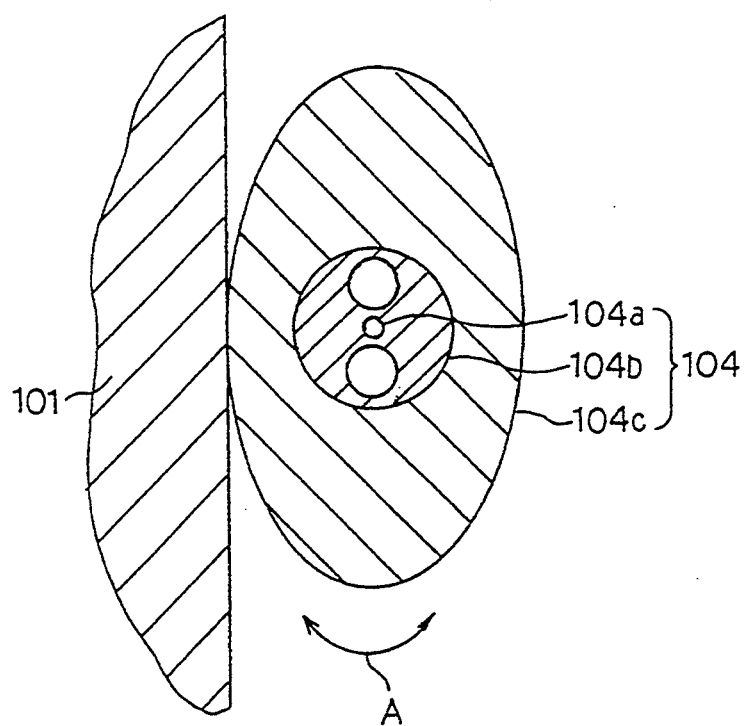
FIG. 13 is a part-sectional view, on an enlarged scale, of the birefringent optical fiber of FIG. 12.

FIG. 13 is an enlarged sectional view of the birefringent fiber 104 of FIG. 12. The birefringent fiber 104 comprises a core portion 104a, a clad layer 104b surrounding the core portion 104a, and an elliptical jacket 104c surrounding the clad layer 104b. Since the birefringent fiber 104 is an elliptical cross section and not a circular cross section, the rotational motion (indicated by the arrow A of FIG. 13) of the birefringent fiber 104 as it is wound on the cylindrical body 101 can be regulated.

Figure 14:
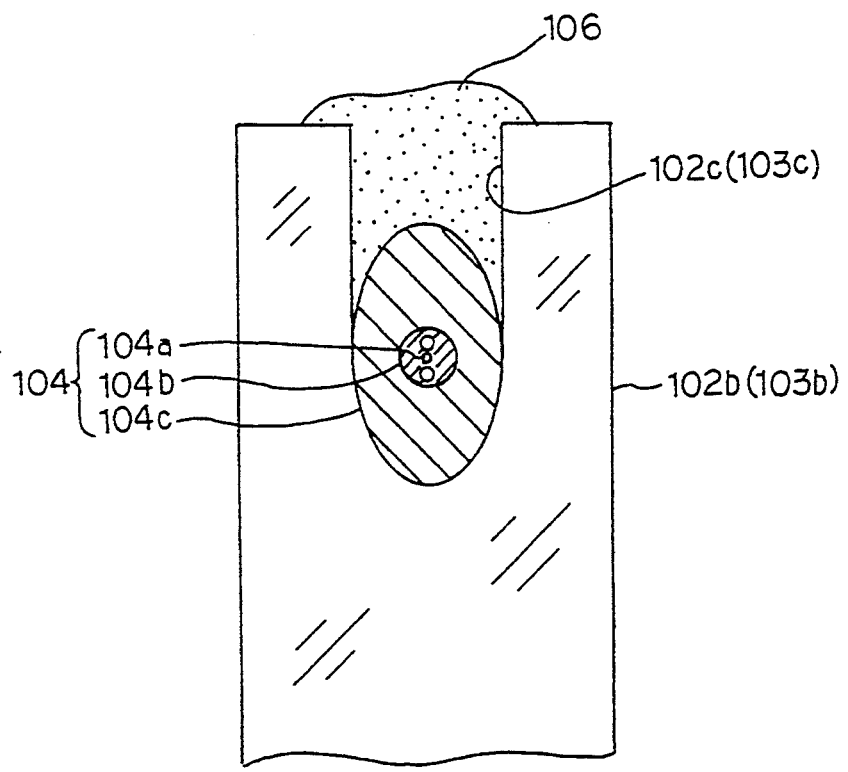
FIG. 14 is a part-sectional view, on an enlarged scale, of the birefringent fiber fixed in the recess of FIG. 11(a) by an adhesive.

FIG. 14 is an enlarged sectional view of the birefringent fiber 104 fixed in the recess 102c of the projection 102b by an adhesive 106. The recess 102c (and 103c) is opened in the axial direction of the cylindrical body 101 and formed into a generally U shape. The radius of curvature of the U-shaped recess 102c (and 103c) is substantially equal to that of the jacket 104c, as shown. Since the U-shaped recess 102c (and 103c) is equal in radius of curvature to the jacket 104c, an occurrence of torsion can be prevented between the winding end of the birefringent fiber 104 and the recess 102c (and 103c).

Figure 15:
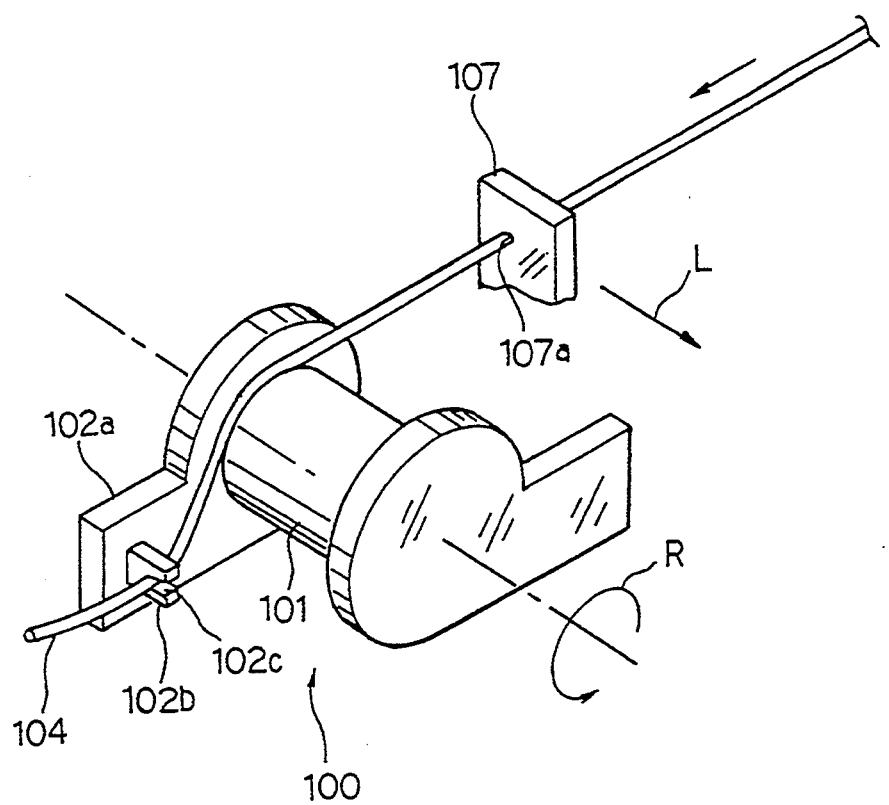
FIG. 15 is a diagram used to explain how the birefringent fiber is wound on the optical fiber type polarizer of the third embodiment of the present invention.

FIG. 15 is a diagram used to explain how the birefringent fiber 104 is wound on the bobbin holder 100. Reference numeral 107 indicates a guide plate formed with a guide aperture 107a which is slightly larger in cross section than the birefringent fiber 104. The cross sections of the guide aperture 107a and the birefringent fiber 104 are similar figures, and in this embodiment they are elliptical. In the winding operation of the birefringent fiber 104, it is first passed through the guide aperture 107a of the guide plate 107. Then, the leading end of the birefringent fiber 104 is fixed in the recess 102c of the small projection 102b. Thereafter, as the bobbin holder 100 is rotated in the direction R of FIG. 15, the guide plate 107 is slowly moved in the direction L of FIG. 15. Since in this structure the torsion of the birefringent fiber 104 is removed when the fiber 104 is passed through the guide aperture 107a substantially equal in cross section to the fiber 104, an undesirable deformation which would be produced in the winding operation can be prevented reliably. Therefore, in accordance with present invention, there is provided an useful technique which can enhance a working efficiency in the winding operation and automate the winding operation.

Figure 16:
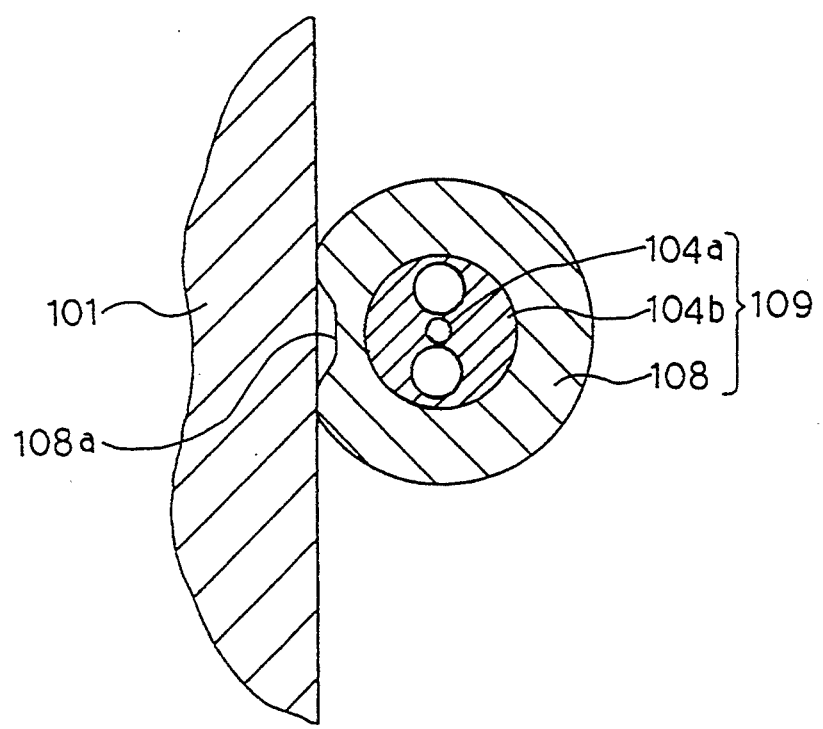
FIG. 16 is a part-sectional view, on an enlarged scale, of one modification of the optical fiber type polarizer according to the third embodiment of the present invention.

While it has been described and illustrated that the cross section of the birefringent fiber is formed into an elliptical shape, the present invention is not limited to this. The cross section can be formed into other shapes other than a circular shape. For example, in a case where, as shown in FIG. 16, a birefringent optical fiber 109 has a jacket 108 whose cross section is a circular shape, the birefringent fiber 109 can be formed with a recess 108a extending in the longitudinal direction thereof. By such a longitudinal recess 108a, the cross section of the birefringent fiber 109 can be formed into a shape other than a circular shape, and the rotational motion of the fiber 109 during the winding operation can be prevented.

Figure 17:
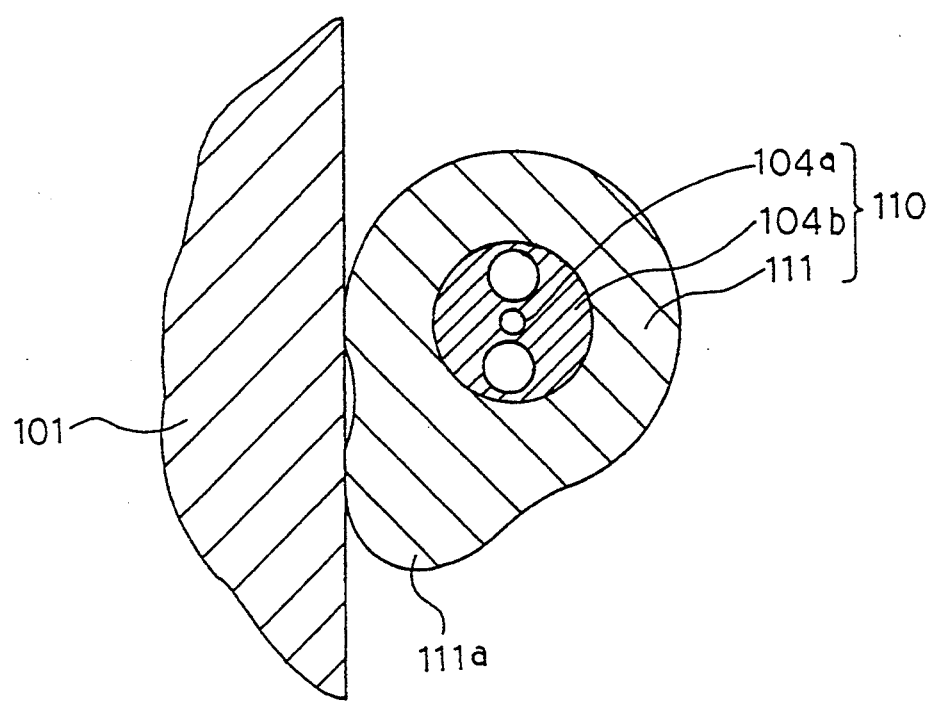
FIG. 17 is a part-sectional view, on an enlarged scale, of another modification of the optical fiber type polarizer according to the third embodiment of the present invention.

In addition, as shown in FIG. 17, a jacket 111 of a birefringent optical fiber 110 can also be formed with a longitudinal projection 111a. Further, in a case of FIG. 18, a birefringent optical fiber 112 and a reinforcement core 115 extending parallel to the fiber 112 are covered by an elliptical jacket 113.

Figure 18:
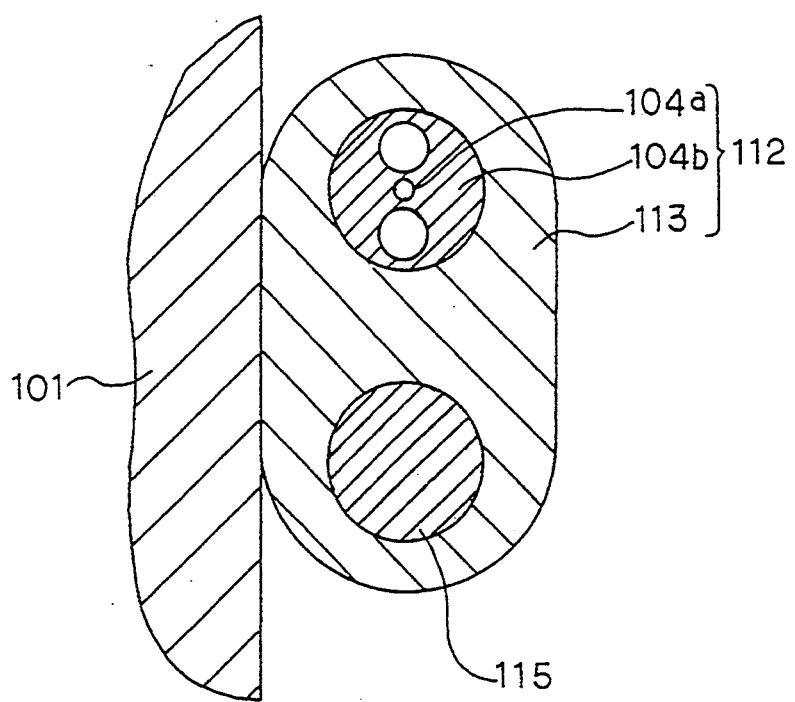
FIG. 18 is a part-sectional view, on an enlarged scale, of another modification of the optical fiber type polarizer according to the third embodiment of the present invention.
Figure 19:
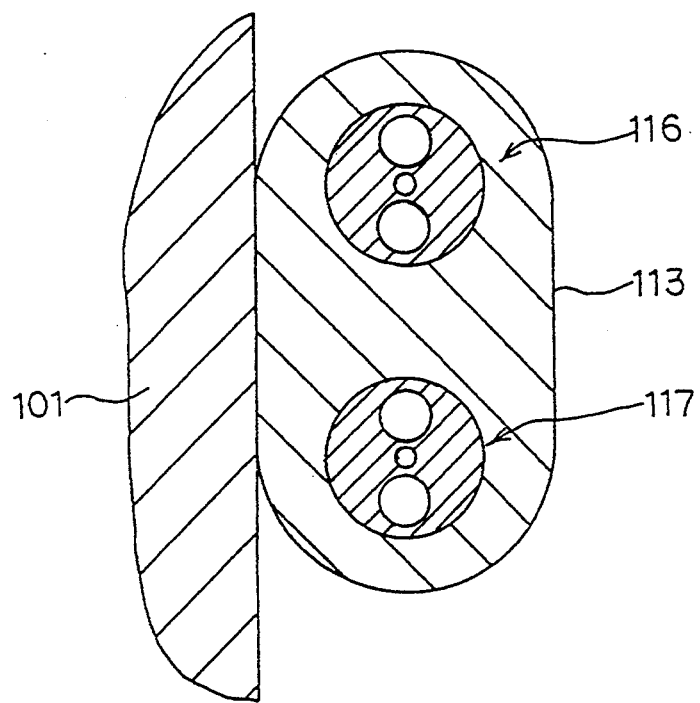
FIG. 19 is a part-sectional view, on an enlarged scale, of another modification of the optical fiber type polarizer according to the third embodiment of the present invention.
Figure 20:
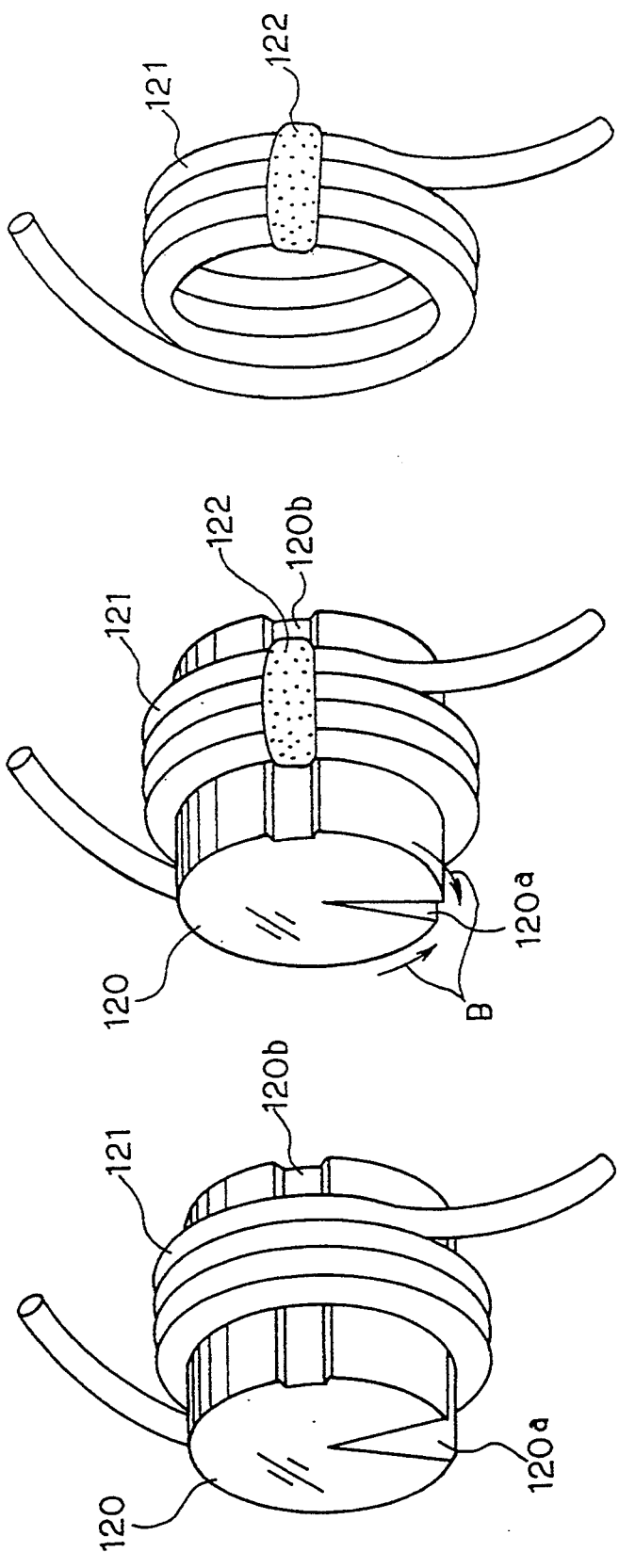
FIGS. 20(a)-20(c) are perspective views showing a fourth embodiment of the optical fiber type polarizer according to the present invention.
Figure 21:
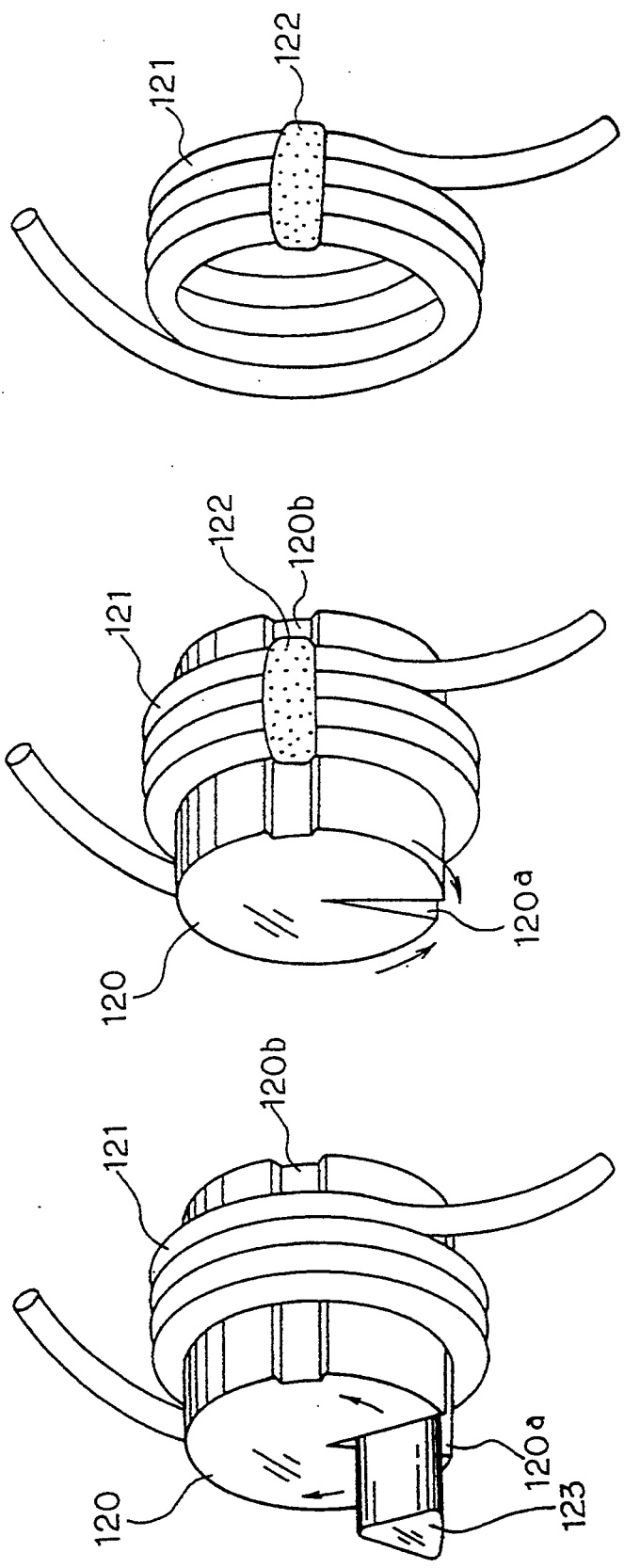
FIGS. 21(a)-21(c) are perspective views showing one modification of the optical fiber type polarizer according to the fourth embodiment of the present invention.
Figure 22:
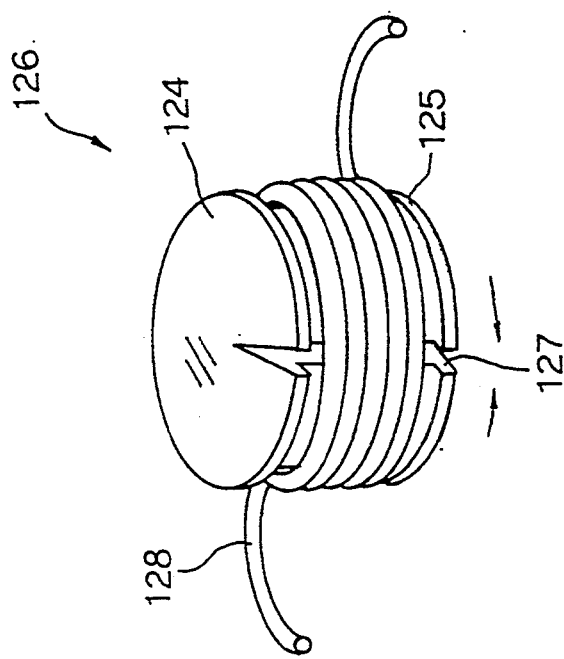
FIGS. 22(a)-22(b) are perspective views showing another modification of the optical fiber type polarizer according to the fourth embodiment of the present invention.
Figure 22:
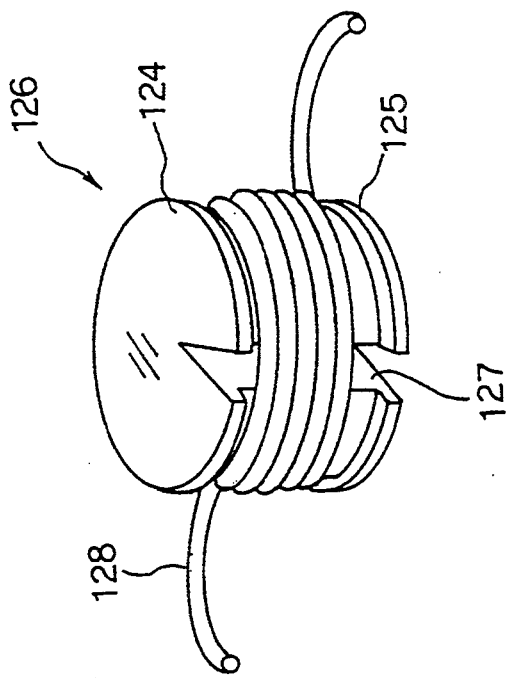
Figure 23:
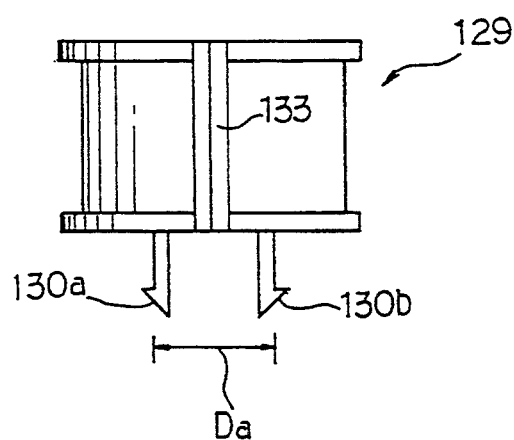
FIGS. 23(a)-23(b) are diagrams showing another modification of the optical fiber type polarizer according to the fourth embodiment of the present invention.
Figure 23:
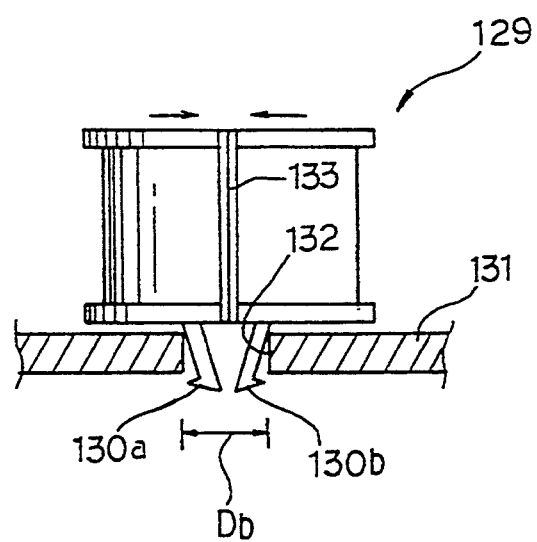

In the embodiment of FIG. 18, the tensile strength can be increased. In a case where, as shown in FIG. 19, two parallel birefringent fibers 116 and 117 are covered by the elliptical jacket 113, two optical fiber type polarizers can be fabricated at the same time for one bobbin by a single winding operation. The embodiment shown in FIG. 19 is advantageous when a multi-shaft gyro is manufactured.

As described above, since in the embodiments shown in FIGS. 11–19 the cross section of the birefringent fiber is formed into a shape other than a circular shape, the rotational motion of the birefringent fiber during the winding operation can be prevented. Therefore, the torsional deformation of the birefringent fiber can be avoided and accordingly there can be provided an optical fiber type polarizer whose characteristics do not change.

A fourth embodiment of the optical fiber type polarizer according to the present invention will hereinafter be described in conjunction with FIGS. 20–24.

In FIGS. 20(a), 20(b) and 20(c), reference numeral 120 denotes a cylindrical body made from elastic material such as resin. This cylindrical body 120 is formed at its outer surface with an axially extending recess portion 120a. The cylindrical body 120 is further formed at a predetermined position thereof with an axially extending groove 120b. The predetermined position of the cylindrical body 120 corresponds to a position at which the winding start and end of a birefringent optical fiber 121 is fixed by an adhesive 122. It is noted that if a plate spacer or adhesive tape is interposed between the axial groove 120b and the birefringent fiber 121, the application of the adhesive 122 on the cylindrical body 120 can be prevented. If in the structure of FIG. 20(b) the forces in the directions B are applied to the cylindrical body 120 after the birefringent fiber 121 has been wound on the cylindrical body 120 and hardened by the adhesive 122, the open width of the recess portion 120a will be narrowed, and the outer circumferential length of the cylindrical body 120 will be reduced. Therefore, the wound birefringent fiber 121 can be removed easily from the cylindrical body 120, so that there can be provided an optical fiber type polarizer which has no bobbin and whose characteristics are not deteriorated.

The advantages of the optical fiber type polarizer having no bobbin are as follows. In general, an optical fiber type polarizer is formed by wining a birefringent fiber on a bobbin holder, but tensions produced during the winding operation cannot be removed completely. In addition, the wound birefringent fiber is always subjected to the side pressure from the bobbin holder. Therefore, if, for example, the tensions produced during the winding operation are changed due to the thermal expansion and the like of the bobbin holder, there is the drawback that the polarization characteristics of the optical fiber type polarizer tend to be changed. In a conventional bobbin holder, it was difficult to provide an optical fiber type polarizer whose characteristics are not deteriorated, since the birefringent fiber is pulled by force when it is removed from the conventional bobbin holder. Since in the structure of FIGS. 20(a)–20(c) the wound birefringent fiber 121 can be removed easily from the cylindrical body 120 without being pulled by force, the optical fiber type polarizer shown in FIG. 20(c) has no deterioration in its characteristics.

FIGS. 21(a)–21(c) are perspective views showing one modification of the optical fiber type polarizer shown in FIGS. 20(a)–20(c), respectively. It is desirable that, before winding the birefringent fiber 121, a wedge 123 be inserted into the recess portion 120a. Because of the wedge 123, the recess portion 120a is prevented from being closed with a pressure produced during the winding operation, and the birefringent fiber can be wound at a correct winding radius. After the adhesive 122 has hardened sufficiently, the wedge 123 is removed from the recess portion 120a and then the wound birefringent fiber 121 is removed from the cylindrical body 120 by closing the recess portion 120a. It is noted that if an easily separable silicon adhesive is used instead of an epoxy adhesive, an occurrence of stresses to be transmitted the birefringent fiber 121 during rewinding can be prevented.

FIGS. 22(a)–22(b) are perspective views showing another modification of the optical fiber type polarizer according to the fourth embodiment of the present invention. Even if, as shown in these figures, a bobbin holder 126 has plates 125 and 126 at the opposite ends thereof, the formation of a recess portion 127 is also effective. In such a case, a birefringent fiber 128 wound on the bobbin holder 126 cannot be removed from the bobbin holder 126, but side pressures to be transmitted the birefringent fiber 128 can be alleviated by closing the recess portion 127 of the bobbin holder 126.

FIGS. 23(a)–23(b) also illustrate another modification of the optical fiber type polarizer according to the fourth embodiment of the present invention. As shown in these figures, a bobbin holder 129 has a pair of clawed members 130a and 130b attached to the lower surface thereof. The space Da between the clawed members 130a and 130b is slightly wider than the diameter Db of an aperture 132 formed in a base plate 131. In this embodiment, if the bobbin holder 129 is brought into engagement with the base plate 131 through the clawed members 130a and 130b, the space Da between the clawed members 130a and 130b will be narrowed and accordingly a recess portion 133 formed in the bobbin holder 129 will be closed automatically.

Figure 24:
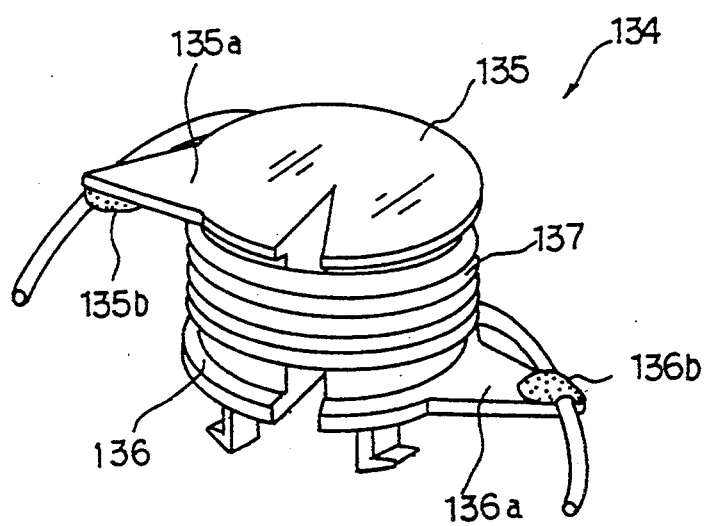
FIG. 24 is a perspective view showing another modification of the optical fiber type polarizer according to the fourth embodiment of the present invention.

FIG. 24 illustrates another modification of the optical fiber type polarizer according to the fourth embodiment of the present invention. A bobbin holder 134 comprises a first plate 135 formed with all extended portion 135a extending in one direction and a second plate 136 formed with an extended portion 136a extending in the opposite direction. The short extra portions of a birefringent fiber 136 extending from the winding start and end thereof are fixed on the extended portions 135a and 136a by adhesives 135b and 136b.

As described above, in the optical fiber type polarizers shown in FIGS. 20–24, they are stable in their characteristics by eliminating the influence of unnecessary forces on a birefringent fiber.

Figure 25:
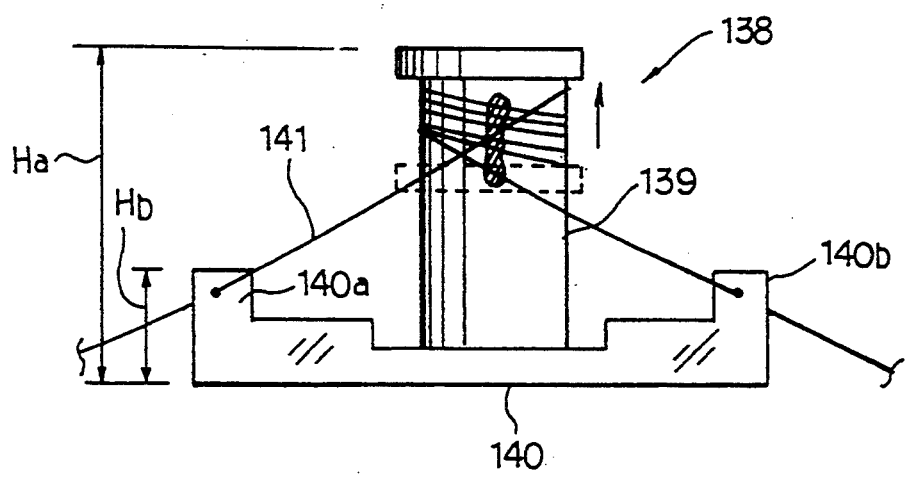
FIGS. 25(a) and 25(b) are diagrams showing the external appearance of the optical fiber type polarizer according to a fifth embodiment of the present invention.
Figure 25:
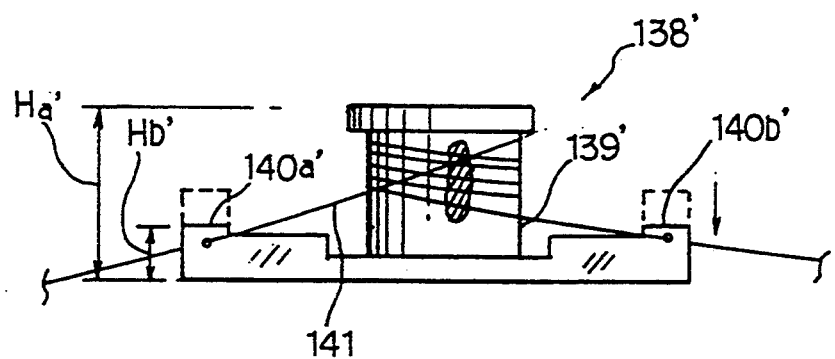

FIGS. 25(a) and 25(b) illustrate a fifth embodiment of the optical fiber type polarizer according to the present invention. As shown in FIG. 25(a), this embodiment is characterized in that the height Ha of a cylindrical body 139 of a bobbin holder 138 is made sufficiently higher than the height Hb of fixing portions 140a and 140b formed in a plate 140 fixed on the cylindrical body 139. As shown in FIG. 25(b), this embodiment is also characterized in that the height Ha' of a cylindrical body 139' of a bobbin holder 138' is made sufficiently lower with respect to the height Hb' of fixing portions 140a' and 140b' formed in a plate 140' fixed on the cylindrical body 139'. Since in these structures an interference between a birefringent fiber 141 (141') and the fixing portions 140a, 140b (140a', 140b') can be avoided during the time that the birefringent fiber is wound on the cylindrical body, the winding operation can be performed without difficulty.

Figure 26:
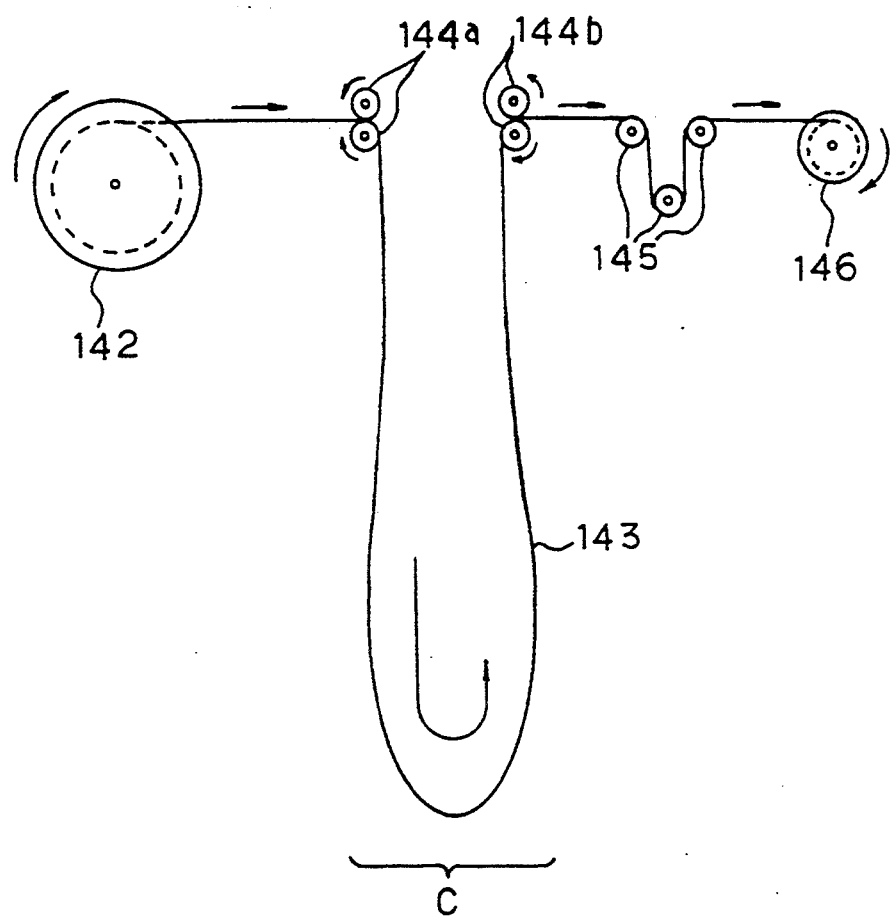
FIG. 26 is a schematic view illustrating a winding apparatus for winding an optical fiber type polarizer according to a six embodiment of the present invention.
Figure 27:
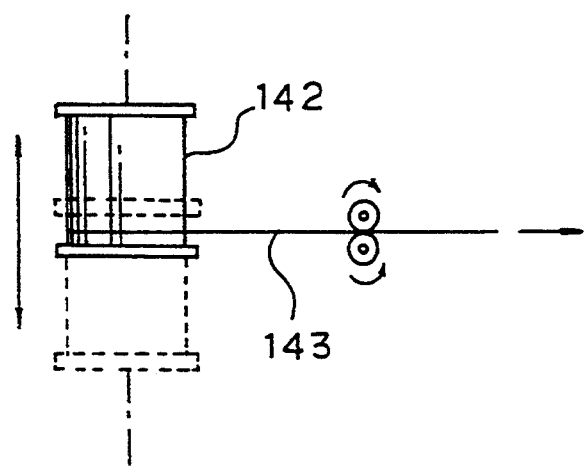
FIG. 27 is a plan view illustrating the supply drum of FIG. 26.

FIGS. 26 and 27 show a winding apparatus for winding an optical fiber type polarizer according to a six embodiment of the present invention, respectively. Reference numeral 142 denotes a supply drum for supplying a birefringent optical fiber 143, and reference numerals 144a and 144b denote first and second feed rollers, respectively. Reference numeral 145 and 146 denote a tension roll and a bobbin holder, respectively. This embodiment is characterized in that the birefringent fiber 143 has a slackened portion C between the first feed roller 144a and the second feed roller 144b. Since the tension of the slackened portion C of the birefringent fiber 143 becomes substantially zero, twists the birefringent fiber 143 can be removed by the restoring force of the fiber 143 itself. The removal ability of twists depends upon the length of the slackened portion C of the birefringent fiber 143, so it is preferable to make the slackened portion C as long as possible. If, as shown in FIG. 27, the supply drum 142 is moved in the axial direction thereof so that the birefringent fiber 143 being unwound from the supply drum 142 becomes Straight, an occurrence of twists can be prevented.

Figure 28:
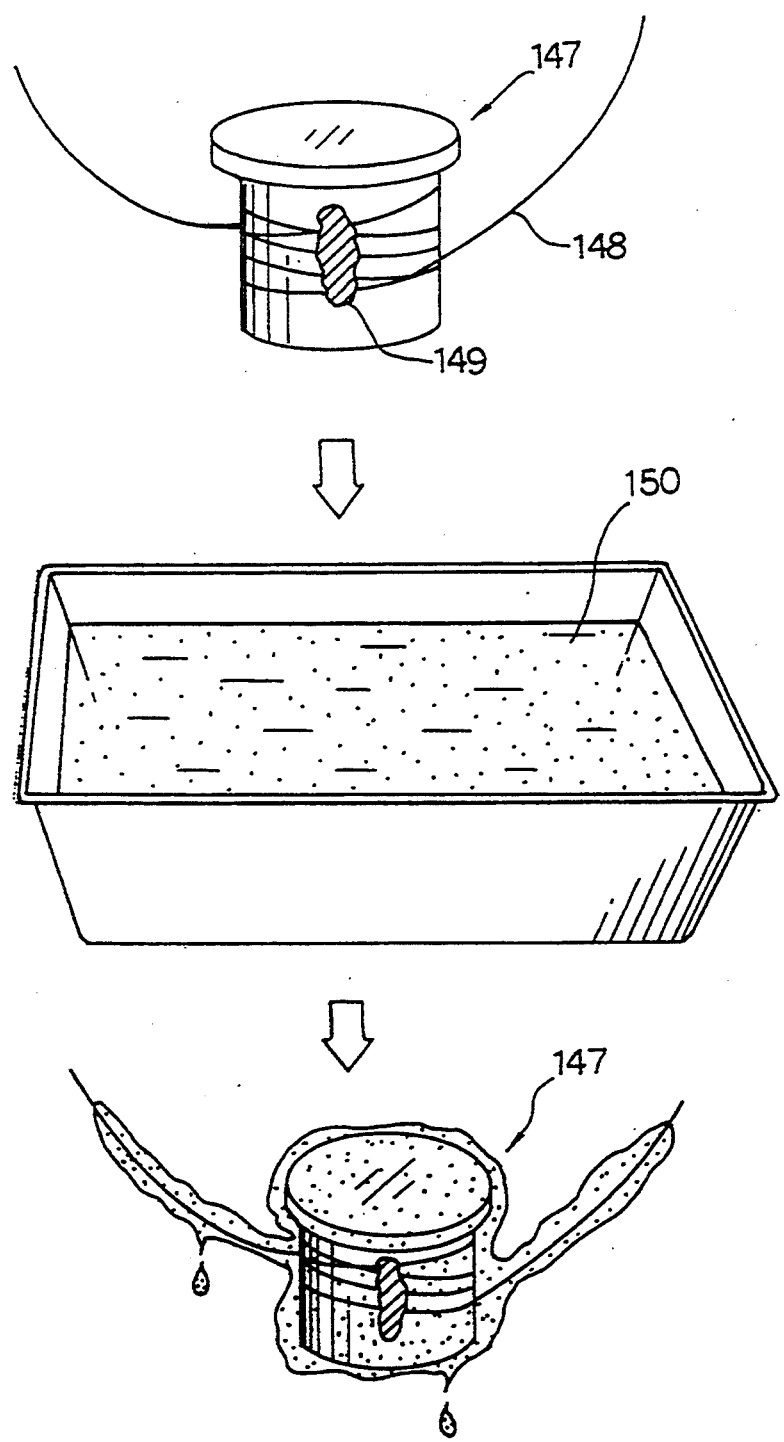
FIGS. 28 and 29 are schematic views a fabrication method of an optical fiber type polarizer according to a seventh embodiment of the present invention.
Figure 29:
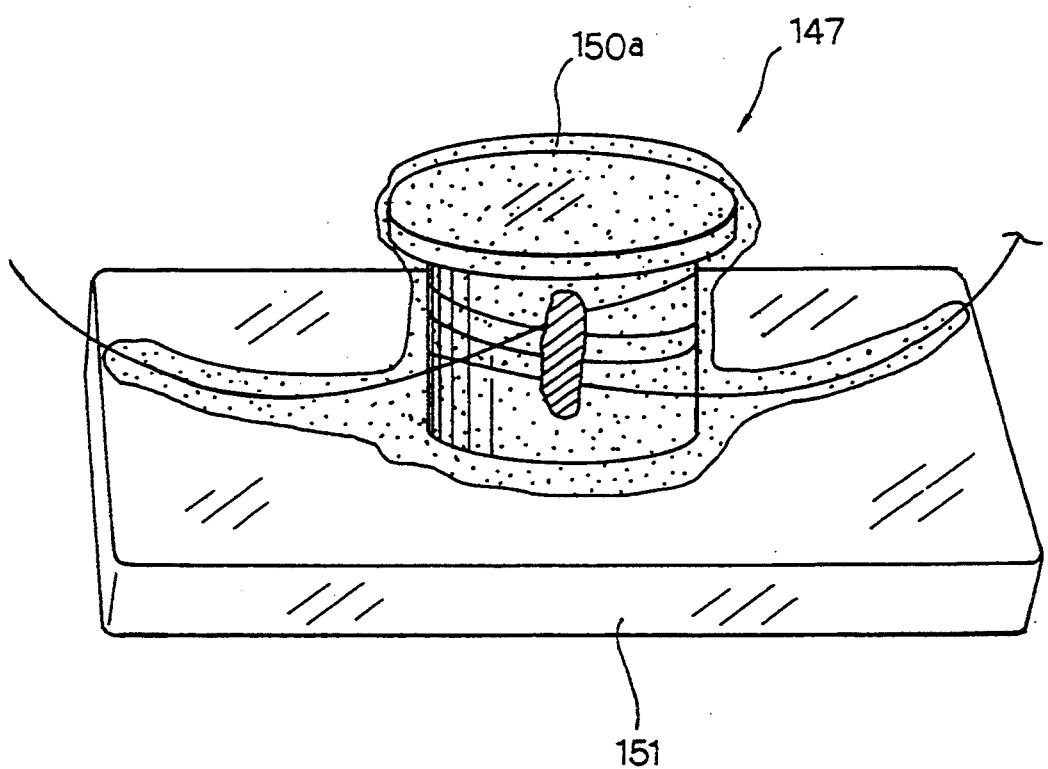
Figure 30:
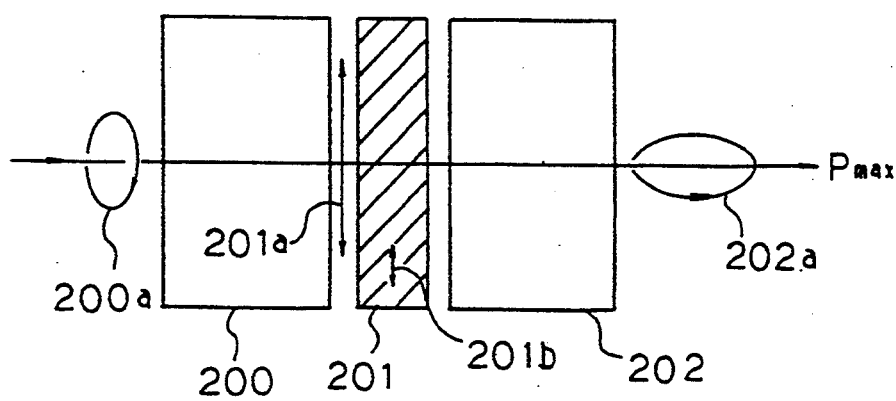
FIGS. 30(a) and 30(b) are diagrams used to explain the principles of an inspection apparatus according to an eighth embodiment of the present invention.
Figure 30:
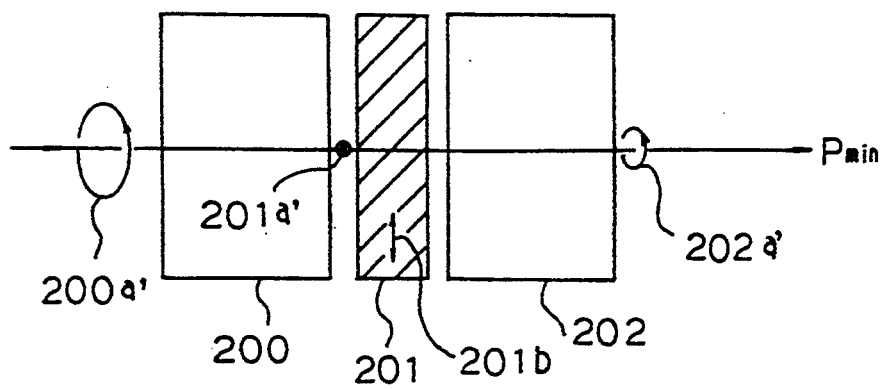

FIGS. 28 and 29 show a fabrication method of an optical fiber type polarizer according to a seventh embodiment of the present invention, respectively. As shown in FIG. 28, a birefringent optical fiber 148 is wound on a bobbin holder 147 and fixed by an adhesive 149. Then, the bobbin holder 147 is immersed in resin solution 150 (e.g., silicon resin). The bobbin holder 147 removed from the resin solution 150, as shown in FIG. 29, is placed on a base plate (preferably, rubber sheet) 151. A resin 150a around the bobbin holder 147 is hardened. In this way, an optical fiber type polarizer is fabricated. In this fabrication method, the fixation of the bobbin holder and the fixation of the short extra portions extending from the winding start and end of the birefringent fiber can be made at the same time by simple steps of immersing the bobbin holder 147 in the resin solution 150, placing the bobbin holder 147 on the base plate 151 and hardening the resin 150a around the bobbin holder 147. Therefore, the time needed for fabrication can be shortened and the working efficiency thus enhanced.

FIGS. 30–37 illustrate an inspection apparatus for inspecting the characteristics of an optical fiber type polarizer. The principles of the inspection apparatus according to the present invention is that, by changing polarized light incident on optical medium including a polarizer (e.g., optical fiber type polarizer) to almost all of the states of polarization of light, the intensity of the light transmitted through the optical medium is measured, and that an extinction ratio of the polarizer is obtained by calculating a ratio of the maximum and minimum values of the measurement. For example, an anisotropic crystal, optical fiber and air can be used as an optical medium. The optical medium is not limited to liquids, gases and solids, but it can be constituted by any medium having isotropy or anisotropy.

FIGS. 30(a) and 30(b) are diagrams used to explain the principles of the inspection apparatus according to the present invention. Polarized light 200a incident on an optical medium 200 is changed to almost all of the states of polarization, with the use of predetermined means to be described later. More particularly, if a variable phase difference and a variable rotation of a plane of polarization are given between two orthogonal polarization components, the state of polarization of the light that transmits through a polarizer 201 to be inspected will move on almost all regions on a Poincare sphere, even if the two orthogonal polarization components are optically coupled in an optical medium 200 and the state of polarization is changed. Therefore, the light incident on the polarizer 201 contains all of states of polarization including linearly polarized light crossing at right angles with or aligned with a transmission axis of the polarizer 201.

Therefore, when the state of polarization 201a of the incident light on the polarizer 201 is aligned with a transmission axis 201b of the polarizer 201, the maximum quantity of the transmitted light is obtained, as shown in FIG. 30(a). When, on the other hand, the state of polarization 201a' of the incident light on the polarizer 201 is vertical with respect to the transmission axis 201b of the polarizer 201, the minimum quantity of the transmitted light is obtained, as shown in FIG. 30(b). As a result, even if the transmitted light from the polarizer 201 to be inspected transmits through an optical medium 202 and there occurs a new change in the state of polarization of the polarized light 202a from the optical medium 202, a ratio of light intensities of the transmitted light beams from the optical medium 202 that is detected finally is identical with a ratio of light intensities of the transmitted light beams from the polarizer 201. Therefore, a ratio of light intensities of the transmitted light beams of the optical medium 202, $P_{max}/P_{min}$, can be determined as an extinction ratio of the polarizer 201.

Figure 31:
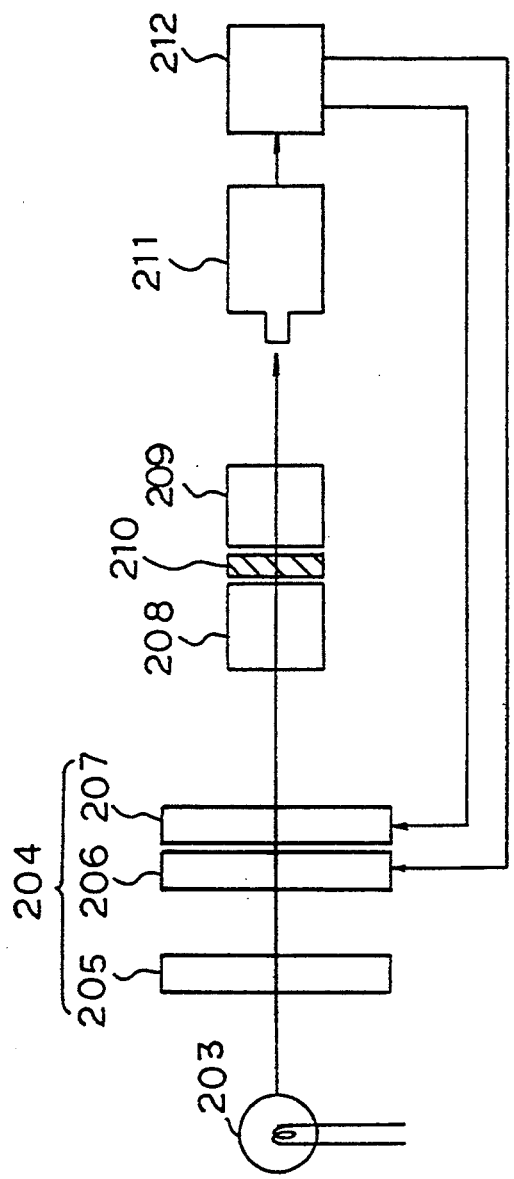
FIG. 31 is a schematic diagram illustrating the inspection apparatus according to the eighth embodiment of the present invention.

FIG. 31 schematically illustrates an example which corresponds to the aforementioned predetermined means and which includes optical means 204 capable of changing light from a light source 203 to almost all of the states of polarization. The optical means 204 comprises a polarizer 205 that converts the light from the light source 203 to linearly polarized light, a phase retarder 206 that introduces a variable phase difference between the two polarized wave components of the linearly polarized light from the polarizer 205, a rotator 207 that rotates a plane of polarization of the light transmitted from the phase retarder 206 by some particular angle. Reference numerals 208 and 209 denote a first optical medium and a second optical medium, respectively. A polarizer 210 to be inspected is interposed between the first and second optical media 208 and 209. Reference numeral 211 denotes a photodetector, and 212 denotes a controller that calculates an extinction ratio and controls the phase retarder 206 and the rotator 207. For example, a birefringent crystal mechanically rotatable about an optical axis can be used as the phase retarder 206 and the rotator 207. In this case, the controller 212 controls the angle of mechanical rotation of the phase retarder 206 or the rotator 207. Also, an electro-optical (or magneto-optical) crystal can be used as the phase retarder 206, and a magneto-optical crystal can be used as the rotator 207. In this case, these crystals are given a variable electric field or a variable magnetic field, and the controller 212 controls the variable electric field or variable magnetic field that is applied to the phase retarder 206 or rotator 207.

In the example of FIG. 31, the light from the light source 203 passes through the polarizer 205 and is linearly polarized. The reason why the polarizer 205 is provided is that the synchronism between the change in the state of polarization of the outputted light from the optical means 204 and the detecting timing in the detector 211 cannot obtained when the light from the light source 203 is unpolarized light. The transmitted light from the polarizer 205 passes through the phase retarder 206 and the rotator 207 and becomes a particular state of polarization. However, by changing an angle of phase shifting of the phase retarder 206 and an angle of rotation of the rotator 207, the state of polarization of the light incident on the optical medium 208 can move on almost all of regions on a Poincare sphere. Because of this, even if the two components crossing at right angles are optically coupled inside the optical medium 208 and the state of polarization is changed, the state of polarization when the light passes through the polarizer 210 is to move on almost all regions on the Poincare sphere. Therefore, sometimes the state of polarization when the light passes through the polarizer 210 becomes linearly polarized light accidentally aligned with the direction of the transmission axis of the polarizer 210, and at this time, the maximum quantity of the transmitted light is obtained. When, on the other hand, the transmitted light from the optical medium 208 is linearly polarized light accidentally perpendicular to the direction of the transmission axis of the polarizer 210, a minimum transmitted light quantity is obtained. Therefore, even if the transmitted light from the polarizer 210 passes through the second optical medium 209 again, an intensity ratio Of the transmitted light beams of the second optical medium 209 will be the same as that of the transmitted light beams from the polarizer 210 and will not change. Therefore, an accurate extinction ratio of the polarizer 210 can be determined by calculating an intensity ratio ($P_{max}/P_{min}$) of the transmitted light beams of the second optical medium 209.

FIG. 32 illustrates one modification of the inspection apparatus of FIG. 31. In this embodiment, a quarter-wave plate 213 is used instead of the phase retarder and a half-wave plate 214 is used instead of the rotator. A light source (quasi-monochromatic light source) 215, a polarizer 216, the quarter-wave plate 213, the a half-wave plate 214, an inspection sample (optical medium including a polarizer to be inspected) 217, and an optical power meter 218 are aligned with one another. 219 is a circuit for driving the light source 215, 220 a first motor for mechanically rotating the quarter-wave plate 213, and 221 a second motor for mechanically rotating the half-wave plate 214. 222 is a control circuit for controlling the rotations of the first and second motors 220 and 221 separately. 223 is a controller which reads the output of the optical power meter 218 at a predetermined interval, calculates a ratio of the maximum and minimum values of the output of the optical power meter 218, and outputs a synchronous signal synchronized with a predetermined cycle to the control circuit 222. 224 is a memory having the output of the optical power meter 218 and the calculated value of the controller 222 stored therein, and 225 is a member for fixing the inspection sample 217.

The polarizer 216, the quarter-wave plate 213, and the half-wave plate 214 as a whole constitute optical means 226 for changing the polarization of light incident on the inspection sample 217 to all states of polarization.

Assume now that the angles of rotation of the quarter-wave plate 213 and half-wave plate 214 are represented by $\theta 1$ (wave/4) and $\theta 2$ (wave/2). It is also assumed that when the fast axis direction of the quarter-wave plate 213 is aligned with the transmission axis direction of the polarizer 216, $\theta 1$ (wave/4) becomes 0, and that when the fast axis direction of the half-wave plate 214 is aligned with the transmission axis direction of the polarizer 216, $\theta 2$ (wave/2) becomes 0.

In the inspection apparatus of FIG. 32, the controller 223 feeds a control signal to the control circuit 222 so that $\theta 1$ (wave/4) becomes 0 (step 1). Then, the controller 223 feeds a control signal to the control circuit 222 so that the half-wave plate 214 rotates by 360° at intervals of a constant angle (this interval is assumed to be C°), reads the detection light intensity of the optical power meter 218 by synchronizing to, the rotation of the-wave plate 214, and feeds the result of the reading to the memory 224 successively (step 2).

If the half-wave plate 214 rotates by 360°, $\theta 1$ (wave/4) is rotated by a constant angle interval (step 3). This constant angle interval is assumed to be D°. Thereafter, the aforementioned step 2 is performed again.

If the operation described above is repeated until $\theta 1$ (wave/4) becomes 0, the number of data obtained will become ((360/C)×(360/D)), and these data are stored in the memory 224. The extinction ratio of the polarizer contained in the inspection sample 217 is determined by calculating a ratio of the maximum and minimum values of the data obtained. The resolution of measurement depends upon the values of C and D, so that the extinction ratio is more accurately obtained, as these values of C and D is decreased.

Figure 33:
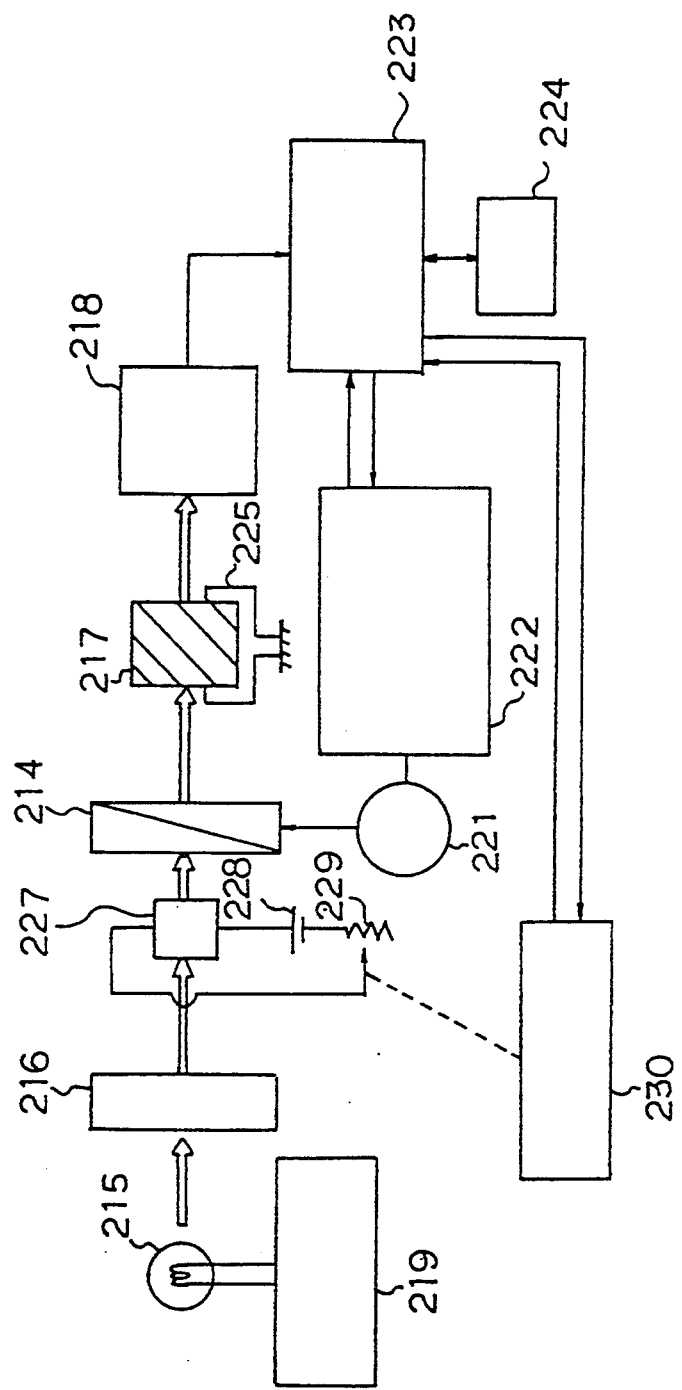
FIG. 33 is a schematic diagram illustrating another modification of the inspection apparatus according to the eighth embodiment of the present invention.

FIG. 33 schematically illustrates another modification of the inspection apparatus according to the present invention. While in the embodiment of FIG. 32 the quarter-wave plate 213 and the half-wave plate 214 has been mechanically driven by the motors 220 and 221, in the embodiment of FIG. 33 an EO crystal (electro-optical crystal) 227 is used instead of the quarter-wave plate and one motor is omitted. As the EO crystal 227, there can be used $KD_2PO_4$, $LiTaO_3$, $Ba_2NaNb_3O_{15}$, $Sr_{0.25}Ba_{0.75}Nb_2O_6$ or $BaTiO_3$. The parts of the embodiment of FIG. 33 substantially identical to corresponding parts of the embodiment of FIG. 32 are represented by the same reference numerals, and therefore a detailed description of the identical parts will not be given.

The transmission axis of a polarizer 216 is rotated by 45° with respect to the optical main axis direction of the EO crystal 227 so that an equal quantity of a polarized light beam can be transmitted in each axis direction of the EO crystal 227. A closed circuit comprising a power supply 228 and a variable resistor 229 is connected to the both sides of the EO crystal 227 so that a voltage to be applied to the EO crystal 227 can be changed by changing the resistance value of the variable resistor 229 by a remote control from a voltage controlled circuit 230.

By changing the voltage to be applied to the EO crystal 227, a phase difference between two transmitted light beams of the EO crystal 227 is changed. If the phase difference is changed between 0° and 90°, an ellipticity of the state of polarization of the polarized light from the EO crystal 227 is changed. This means that the state of polarization moves on the longitude on the Poincare sphere. Further, if the light from the EO crystal 227 transmits through the half-wave plate 214, the direction of polarization is rotated in an arbitrary direction. This means that the state of polarization moves on the longitude on the Poincare sphere.

Therefore, by suitably changing the applied voltage of the EO crystal 227 and the angle of rotation of the half-wave plate 214, the state of polarization of light incident on the inspection sample 217 can be changed so that the state of polarization can move on all regions on the Poincare sphere. Further, the apparatus of FIG. 33 can be operated by only one motor, so that the structure can be made simpler and the inspection time can be shortened as compared with the case of two motors.

Figure 34:
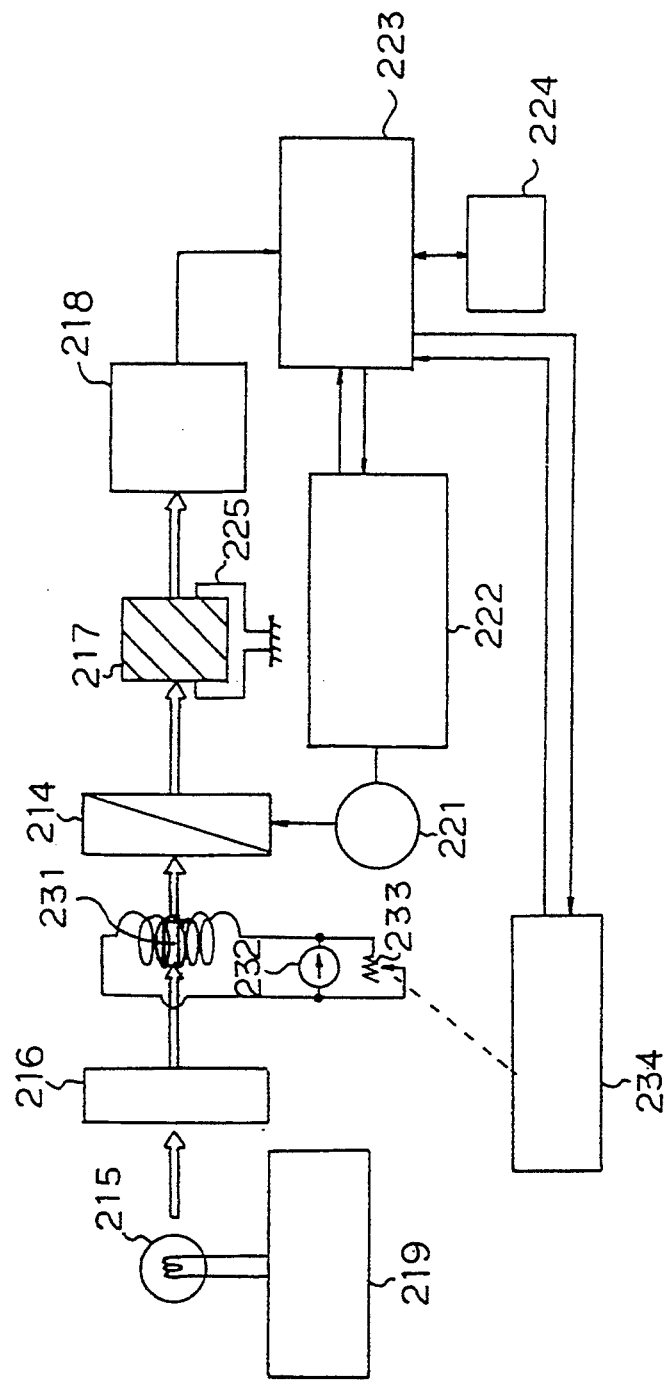
FIG. 34 is a schematic diagram illustrating another modification of the inspection apparatus according to the eighth embodiment of the present invention.

FIG. 34 shows another modification of the inspection apparatus of the present invention. A MO crystal (magneto-optical crystal) 231 is used instead of the EO crystal. The MO crystal shows double refraction, when a magnetic field is applied in a direction crossing at right angles with an incident light beam. The MO crystal, for example, may comprise aromatic compound. 232 is an ac power supply, 233 a variable resistor, and 234 a current controlled circuit for controlling a value of the variable resistor 233. The other parts are identical with corresponding parts of FIG. 33.

In the embodiment of FIG. 34, the state of polarization of light incident on the inspection sample 217 can also be changed so that the state of polarization can move on all regions on the Poincare sphere. In addition, the apparatus of FIG. 34 can be operated by only one motor, so that the structure can be made simpler and the inspection time can be shortened as compared with the case of two motors.

Figure 35:
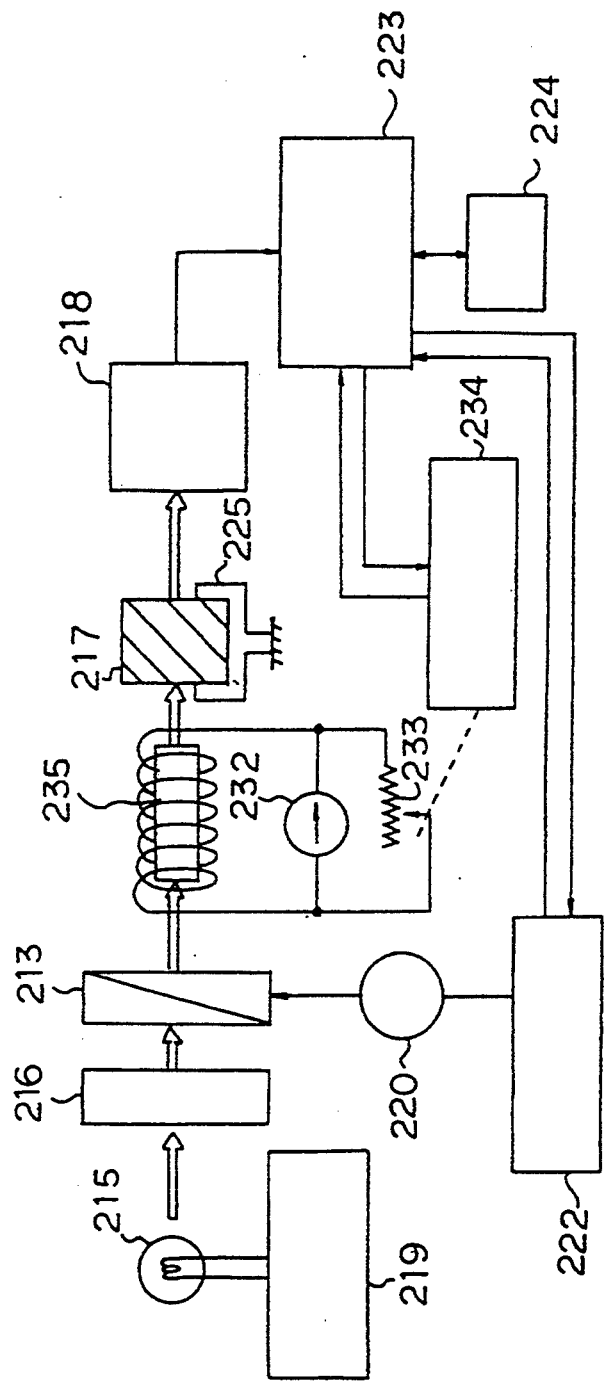
FIG. 35 is a schematic diagram illustrating another modification of the inspection apparatus according to the eighth embodiment of the present invention.

FIG. 35 is an example in which a MO crystal 235 showing Faraday effect is used instead of the half-wave plate. The MO crystal 235 can be constituted by a rock crystal or a thin film iron. In this example, the polarization direction of the light from the quarter-wave plate 213 is rotated in an arbitrary direction, when the light passes through the MO crystal 235. That is, the state of polarization moves on the longitude on the Poincare sphere. Like the embodiment of FIG. 34, the state of polarization of light incident on the inspection sample 217 can also be changed so that the state of polarization can move on all regions on the Poincare sphere. In addition, the apparatus of FIG. 35 can also be operated by only one motor, so that the structure can be made simpler and the inspection time can be shortened as compared with the case of two motors.

Figure 36:
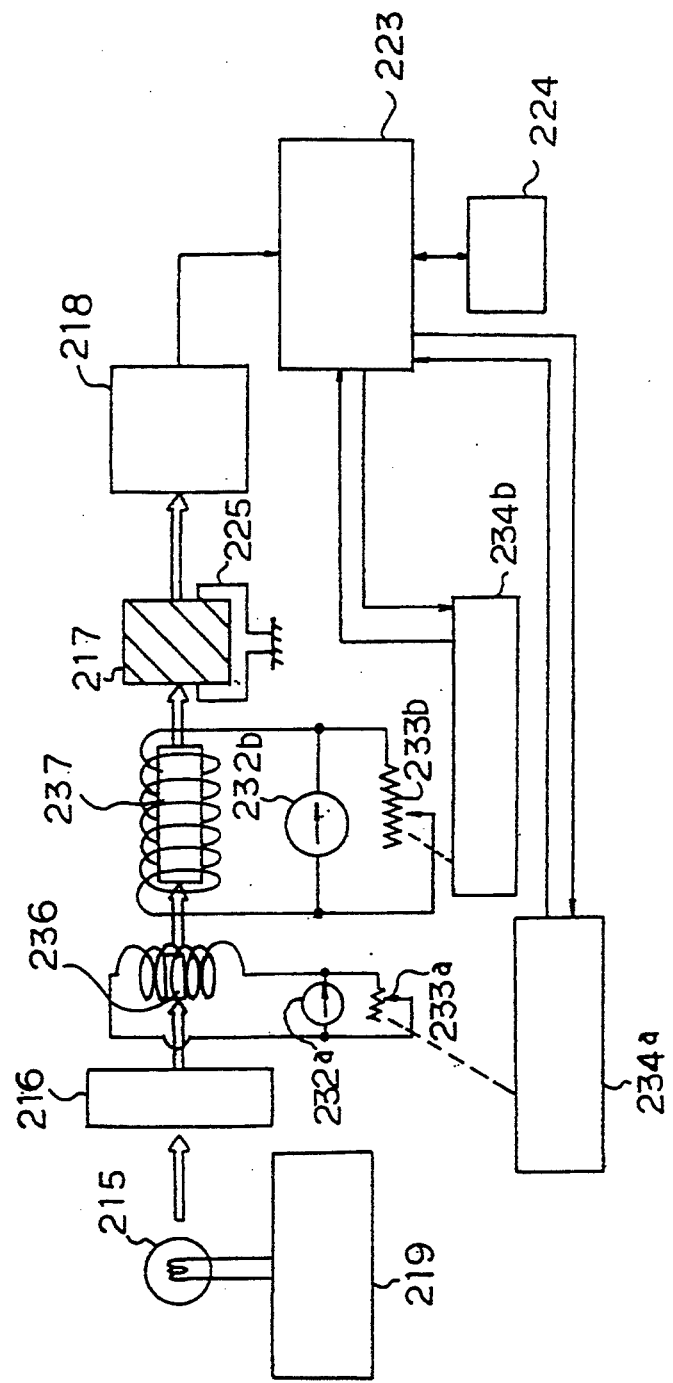
FIG. 36 is a schematic diagram illustrating another modification of the inspection apparatus according to the eighth embodiment of the present invention.

FIG. 36 is an example in which the quarter-wave plate and the half-wave plate are replaced with MO crystals 236 and 237. 232a and 232b are ac power supplies, respectively. 233a and 233b are variable resistors, respectively. 234a and 234b are current controlled circuits for controlling values of the variable resistors 233a and 233b, respectively. Like the embodiment of FIG. 34, the state of polarization of light incident on the inspection sample 217 can also be changed so that the state of polarization can move on all regions on the Poincare sphere. In addition, the apparatus of FIG. 36 can also be operated by only one motor, so that the structure can be made simpler and the inspection time can be shortened as compared with the case of two motors.

Figure 37:
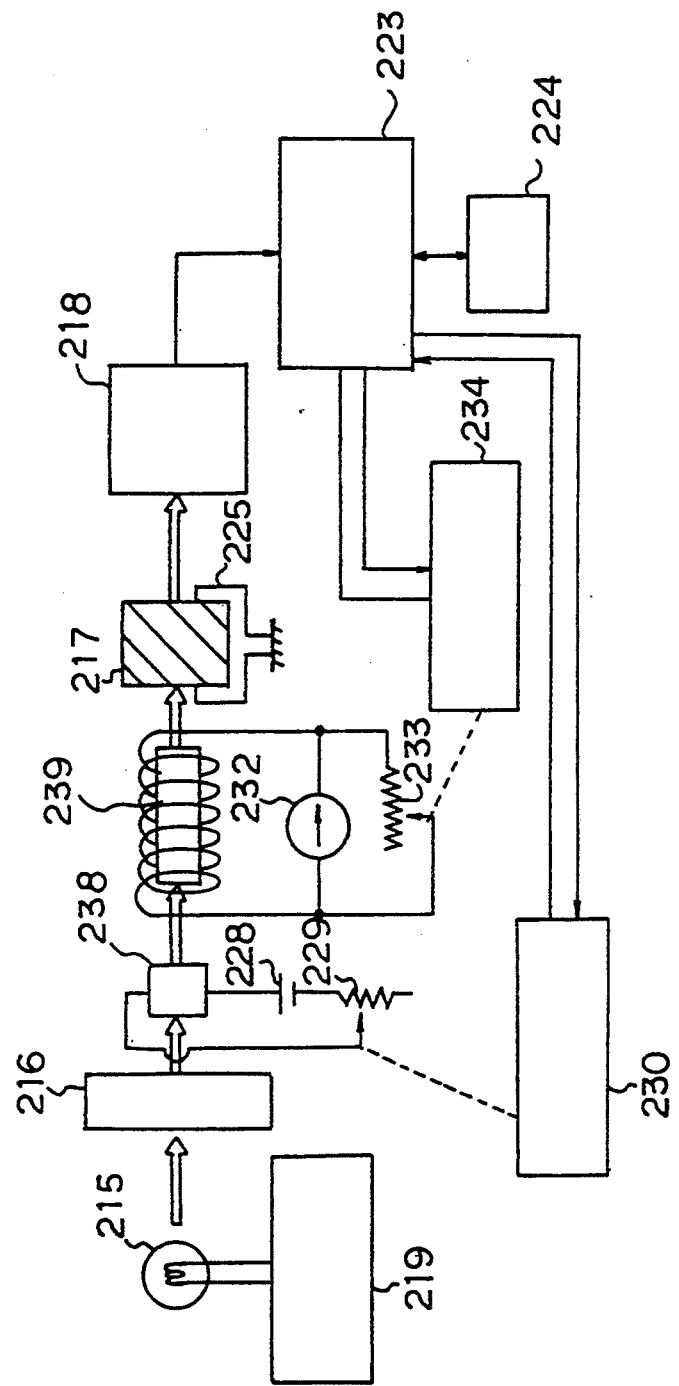
FIG. 37 is a schematic diagram illustrating another modification of the inspection apparatus according to the eighth embodiment of the present invention.
Figure 38A:
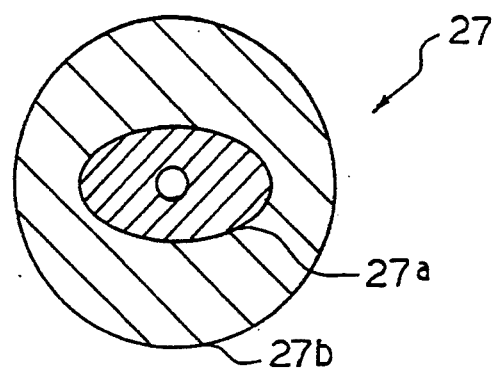
FIG. 38(a) is a schematic view illustrating a conventional optical fiber having a characteristic of double refraction.
Figure 38B:
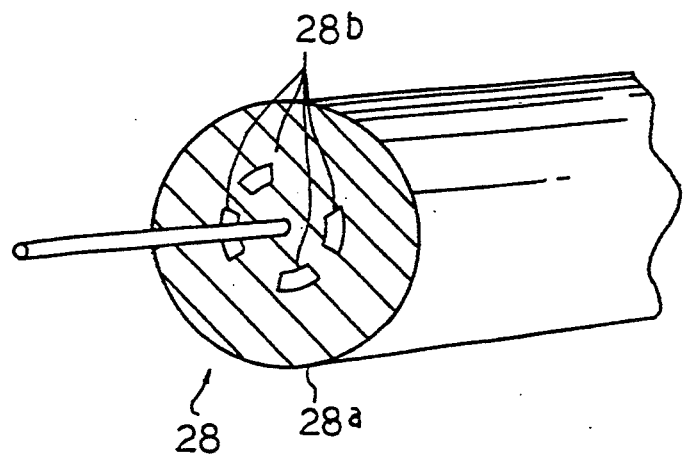
FIG. 38(b) is a schematic view illustrating another conventional optical fiber having a characteristic of double refraction.
Figure 39:
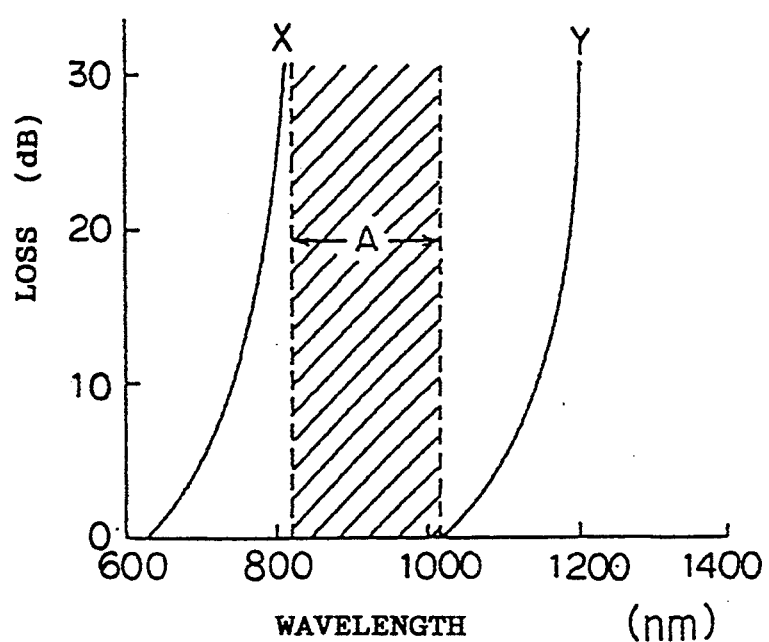
FIG. 39 is a graph illustrating a typical wave-length characteristic of the light transmitted through a conventional optical fiber type polarizer.
Figure 40:
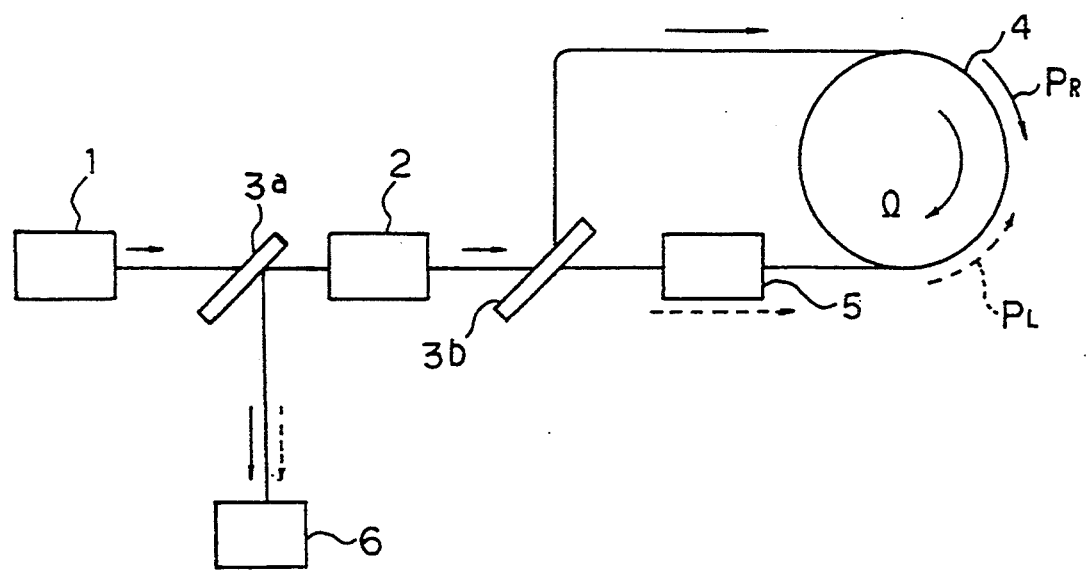
FIG. 40 is a block diagram used to explain the principles of a conventional optical fiber gyro.

FIG. 37 is an example in which an EO crystal 238 is used instead of the quarter-wave plate and a MO crystal 239 is used instead of the half-wave plate. As in the case of the embodiment shown in FIG. 34, the state of polarization of light incident on the inspection sample 217 can also be changed so that the state of polarization can move on all regions on the Poincare sphere. In addition, the apparatus of FIG. 37 can also be operated by only one motor, so that the structure can be made simpler and the inspection time can be shortened as compared with the case of two motors.

As described above, in the embodiments shown in FIGS. 30-37, the intensity ratio of the transmitted light quantities of the inspection sample 217 has been obtained by changing the state of polarization of the polarized light incident on the inspection sample 217 so that it becomes in all possible states of polarization. Therefore, an extinction ratio of a polarizer to be inspected can be measured accurately without the influence of the polarization characteristics of an optical medium other than the polarizer. In a case where a polarizer to be inspected is an optical fiber type polarizer, the inspection method according to the present invention is particularly effective.

While the subject invention has been described with relation to the preferred embodiments, various modifications and adaptations thereof will now be apparent to those skilled in the art. All such modifications and adaptations as fall within the scope of the appended claims are intended to be covered thereby.

What we claim is:

1. An optical fiber type polarizer comprising:
   a first optical fiber constituted by a birefringement optical fiber wound at a predetermined winding radius and having winding start and end fixed to each other by an adhesive, said first optical fiber having short extra portions respectively extending from said winding start and end, and the length of each of said short extra portions being at least as small as said predetermined winding radius;
   a second optical fiber spliced to one of said short extra portions of said first optical fiber; and
   a third optical fiber spliced to the other of said short extra portions of said first optical fiber.

2. An optical fiber type polarizer as set forth in claim 1, wherein each of said second and third optical fiber comprises a birefringent optical fiber smaller in index of double refraction than said birefringent optical fiber constituting said first optical fiber wound at said predetermined radius.

3. An optical fiber type polarizer comprising:
   a bobbin holder;
   a first optical fiber constituted by a birefringent optical fiber wound at a predetermined winding radius on said bobbin holder and having winding start and end fixed to each other by an adhesive, said first optical fiber having short extra portions respectively extending from said winding start and end, and the length of each of said short extra portions being at least as small as the predetermined winding radius;
   a second optical fiber spliced to one of said short extra portions of said first optical fiber; and
   a third optical fiber spliced to the other of said short extra portions of said first optical fiber.

4. An optical fiber type polarizer as set forth in claim 3, wherein said bobbin holder has members mounted at the opposite ends thereof, and said short extra portions of said first optical fiber are fixed to said members.

5. An optical fiber type polarizer as set forth in claim 3, wherein said birefringent fiber wound on said bobbin holder has a cross section other than a circular shape.

6. A method of fabricating an optical fiber type polarizer, comprising the steps of:
   feeding a birefringent optical fiber having an elliptical cross section;
   winding the fed birefringent optical fiber on a bobbin holder; and
   guiding said fed birefringent optical fiber in such a manner that when the birefringent optical fiber is wound on said bobbin holder, the major axis of the elliptical cross section of the birefringent optical fiber is held in parallel relationship to the center axis of said bobbin holder.

7. A method of fabricating an optical fiber type polarizer, comprising the steps of:
   feeding a birefringent optical fiber having at least two surface portions extending along the center axis of said birefringent optical fiber and arranged in spaced-apart and flush relationship with each other;
   winding the fed birefringent optical fiber on a bobbin holder; and
   guiding said fed birefringent optical fiber in such a manner that when the birefringent optical fiber is wound on said bobbin holder, said surface portions of said birefringent optical fiber are brought into contact with the peripheral surface of said bobbin holder.

8. A method of fabricating an optical fiber type polarizer, comprising the steps of:
   preparing a birefringent optical fiber and a bobbin holder having a cylindrical body formed at its outer surface with a recess extending in an axial direction of said cylindrical body, and said cylindrical body is made from an elastic member;
   winding said birefringent optical fiber on said bobbin holder to make a plurality of loops;
   fixing the loops of the wound birefringent optical fiber made in the winding step to One another by an adhesive;
   constricting said bobbin holder in its inwardly radial direction in a manner closing said recess after said fixing step; and
   extracting said bobbin holder from said wound birefringent optical fiber during constricting step.

9. A method of fabricating an optical fiber type polarizer, comprising the steps of:
   preparing a birefringent optical fiber, a bobbin holder including a cylindrical body formed at its outer surface with a recess extending in an axial direction of said cylindrical body, a base plate having a through bore, said cylindrical body being made from an elastic member, said bobbin holder further including a pair of clawed members securely fixed to one of the axial opposite end portions of said cylindrical body to extend in the axial direction of said cylindrical body and face each other across said recess of said cylindrical body, and said through bore of said base plate permitting said clawed members to be inserted therein only when said cylindrical body is constricted in its inward radial direction by closing said recess of said cylindrical body;

winding said birefringent optical fiber on said bobbin holder to make a plurality of loops;

fixing the loops of the wound birefringent optical fiber made in the winding step to one another by an adhesive;

constricting said cylindrical body of said bobbin holder in a manner closing said recess of said cylindrical body by applying an inwardly radial force to said cylindrical body after said fixing step;

inserting said clawed members of said bobbin holder in said through bore of said base plate during said constricting step; and removing said inwardly radial force from said cylindrical body of said bobbin holder so that said clawed members of said bobbin holder are engaged with said base plate through said through bore of said base plate to securely connect said bobbin holder to said base plate.

10. An apparatus for fabricating an optical fiber type polarizer, comprising:

fiber feeding means for feeding a birefringent optical fiber in the air to downwardly drop the fed birefringent optical fiber;

a bobbin holder having said fed birefringent optical fiber wound thereon; and fiber hoisting means, provided between said fiber feeding means and said bobbin holder, for hoisting said birefringement optical fiber downwardly dropped by said fiber feeding means with said birefringement optical fiber being slackened between said fiber feeding means and said fiber hoisting means to feed the hoisted birefringent optical fiber to said bobbin holder.

11. A method of fabricating an optical fiber type polarizer, comprising the steps of:

winding a birefringent optical fiber on a bobbin holder, the fiber having a winding start and a winding end;

fixing said winding start and end of said birefringent optical fiber to each other by an adhesive;

immersing said bobbin holder with the wound birefringent optical fiber in resin solution contained in a vessel; and removing said bobbin holder and said wound birefringent optical fiber with the resin solution adhering thereto from said vessel and then placing the removed bobbin holder on a base plate to fix said bobbin holder with said wound birefringent optical fiber to said base plate by solidifying in the air said resin solution adhering to said bobbin holder and said wound birefringent optical fiber.

12. An apparatus for inspecting a polarizer, comprising:

optical means for introducing a variable phase difference between two polarized wave components of linearly polarized light crossing at right angles and for giving a variable rotation of a plane of polarization between said two polarized wave components; and means for calculating an extinction ratio of the polarizer from a ratio of the maximum and minimum values of a light intensity of said linearly polarized light transmitted through an inspection sample including said polarizer.

13. An apparatus as set forth in claim 12, wherein said polarizer comprises an optical fiber type polarizer.

* * * * *